(12) United States Patent
Iizuka

(10) Patent No.: US 6,950,869 B2
(45) Date of Patent: Sep. 27, 2005

(54) INFORMATION PROCESSING APPARATUS, METHOD AND MEMORY MEDIUM THEREFOR

(75) Inventor: Toshiaki Iizuka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 760 days.

(21) Appl. No.: 09/760,564

(22) Filed: Jan. 16, 2001

(65) Prior Publication Data

US 2001/0009018 A1 Jul. 19, 2001

(30) Foreign Application Priority Data

Jan. 18, 2000 (JP) .................................... 2000-008867
Dec. 5, 2000 (JP) .................................... 2000-370134

(51) Int. Cl.[7] .................................... G06F 15/173
(52) U.S. Cl. .................. 709/224; 709/235; 709/228; 709/203; 709/217; 710/15; 710/18; 710/19; 710/25; 710/42
(58) Field of Search ............................ 709/224, 235, 709/228, 203, 217; 710/15, 18, 19, 25, 42

(56) References Cited

U.S. PATENT DOCUMENTS

| | | | | | |
|---|---|---|---|---|---|
| 5,323,393 | A | * | 6/1994 | Barrett et al. | 370/449 |
| 5,694,618 | A | * | 12/1997 | Hibino | 710/46 |
| 5,727,135 | A | * | 3/1998 | Webb et al. | 358/1.14 |
| 5,774,678 | A | * | 6/1998 | Motoyama | 710/100 |
| 5,819,015 | A | * | 10/1998 | Martin et al. | 358/1.15 |
| 6,092,078 | A | * | 7/2000 | Adolfsson | 707/102 |
| 6,289,371 | B1 | * | 9/2001 | Kumpf et al. | 709/203 |

* cited by examiner

Primary Examiner—Anthony Knight
Assistant Examiner—Thomas Pham
(74) Attorney, Agent, or Firm—Milbank, Tweed, Hadley & McCloy LLP

(57) ABSTRACT

The invention is to provide an information processing apparatus capable of easily setting operation parameters in acquiring various status from the plural peripheral apparatus, and a method therefor. In an image for setting the time-out value for a protocol for acquiring the status of the peripheral apparatus on the network, a change by the user on a time-out value for all the status acquisition from the peripheral apparatus is reflected on the time-out values for acquisitions of various statuses.

21 Claims, 25 Drawing Sheets

FIG. 3

SET TIME OUT — 300

- STATUS OF PERIPHERAL (1.0—100.0 SEC) — 30 — [50.0] — 31
- REMAINING INK IN PRINTER (1.0—50.0 SEC) — 32 — [5.0] — 33
- STATUS OF SCANNER P/S (1.0—50.0 SEC) — 34 — [10.0] — 35
- STATUS OF MODEM LINE (1.0—50.0 SEC) — 36 — [15.0] — 37

[CLOSE]

FIG. 20

| SET TIME OUT | |
|---|---|
| ACCESS TO PERIPHERAL (1.0—100.0 SEC) ⟋2000 | 80.0 ⟋2001 |
| ACCESS TO PRINTER (1.0—80.0 SEC) ⟋2002 | 20.0 ⟋2003 |
| STATUS OF PRINTER (1.0—20.0 SEC) ⟋2004 | 5.0 ⟋2005 |
| OUTPUT FROM PRINTER (1.0—20.0 SEC) ⟋2006 | 10.0 ⟋2007 |
| ACCESS TO SCANNER (1.0—80.0 SEC) ⟋2008 | 80.0 ⟋2009 |
| STATUS OF SCANNER (1.0—80.0 SEC) ⟋2010 | 30.0 ⟋2011 |
| IMAGE FROM SCANNER (1.0—80.0 SEC) ⟋2012 | 40.0 ⟋2013 |
| CLOSE | |

FIG. 21

SET TIME OUT AND RETRY

TIME OUT
- ACCESS TO PERIPHERAL (1.0—100.0 SEC) /2100 — 80.0 /2101
- ACCESS TO PRINTER (1.0—80.0 SEC) /2102 — 20.0 /2103
- STATUS OF PRINTER (1.0—20.0 SEC) /2104 — 5.0 /2105
- OUTPUT FROM PRINTER (1.0—20.0 SEC) /2106 — 10.0 /2107
- ACCESS TO SCANNER (1.0—80.0 SEC) /2108 — 80.0 /2109
- STATUS OF SCANNER (1.0—80.0 SEC) /2110 — 30.0 /2111
- IMAGE FROM SCANNER (1.0—80.0 SEC) /2112 — 40.0 /2113

RETRY
- ACCESS TO PERIPHERAL (1—40 TIMES) /2114 — 40 /2115
- ACCESS TO PRINTER (1—10 TIMES) /2116 — 10 /2117
- STATUS OF PRINTER (1—10 TIMES) /2118 — 5 /2119
- OUTPUT FROM PRINTER (1—10 TIMES) /2120 — 10 /2121
- ACCESS TO SCANNER (1—40 TIMES) /2122 — 40 /2123
- STATUS OF SCANNER (1—40 TIMES) /2124 — 30 /2125
- IMAGE FROM SCANNER (1—40 TIMES) /2126 — 40 /2127

CLOSE

FIG. 22

SET TIME OUT AND RETRY

TIME OUT

| | | |
|---|---|---|
| ACCESS TO PERIPHERAL (1.0—100.0 SEC) /2200 | 80.0 | /2201 |
| ACCESS TO PRINTER (1.0—80.0 SEC) /2202 | 20.0 | /2203 |
| STATUS OF PRINTER (1.0—20.0 SEC) /2204 | 5.0 | /2205 |
| OUTPUT FROM PRINTER (1.0—20.0 SEC) /2206 | 10.0 | /2207 |
| ACCESS TO SCANNER (1.0—80.0 SEC) /2208 | 80.0 | /2209 |
| STATUS OF SCANNER (1.0—80.0 SEC) /2210 | 30.0 | /2211 |
| IMAGE FROM SCANNER (1.0—80.0 SEC) /2212 | 40.0 | /2213 |

RETRY

| | | |
|---|---|---|
| ACCESS TO PERIPHERAL (1—40 TIMES) /2214 | 20 | /2215 |
| ACCESS TO PRINTER (1—10 TIMES) /2216 | 10 | /2217 |
| STATUS OF PRINTER (1—10 TIMES) /2218 | 5 | /2219 |
| OUTPUT FROM PRINTER (1—10 TIMES) /2220 | 10 | /2221 |
| ACCESS TO SCANNER (1—20 TIMES) /2222 | 20 | /2223 |
| STATUS OF SCANNER (1—20 TIMES) /2224 | 20 | /2226 |
| IMAGE FROM SCANNER (1—20 TIMES) /2227 | 20 | /2228 |

CLOSE

FIG. 23

SET TIME OUT

TYPE OF NETWORK ⎯⎯⎯⎯⎯⎯⎯⎯⎯⎯⎯⎯⎯⎯⎯ 2300
- ○ LOW SPEED 2301
- ⊙ HIGH SPEED 2302

STATUS OF PERIPHERAL (1.0—100.0 SEC) 2303     2304 [ 80.0 ]

STATUS OF LOCAL APPARATUS 2305
  (1.0—80.0 SEC)     2306 [ 20.0 ]

STATUS OF LOCAL PRINTER 2307
    (1.0—20.0 SEC)     2308 [ 5.0 ]

STATUS OF LOCAL SCANNER 2309
    (1.0—20.0 SEC)     2310 [ 10.0 ]

STATUS OF NETWORK APPARATUS 2311
  (1.0—80.0 SEC)     2312 [ 80.0 ]

STATUS OF NETWORK PRINTER 2313
    (1.0—80.0 SEC)     2314 [ 30.0 ]

STATUS OF NETWORK SCANNER 2315
    (1.0—80.0 SEC)     2316 [ 40.0 ]

STATUS OF APPARATUS FOR OTHER COMPUTER 2317
  (1.0—80.0 SEC)     2318 [ 60.0 ]

STATUS OF PRINTER FOR OTHER COMPUTER 2319
    (1.0—60.0 SEC)     2320 [ 25.0 ]

STATUS OF SCANNER FOR OTHER COMPUTER 2321
    (1.0—60.0 SEC)     2322 [ 30.0 ]

[ CLOSE ]

FIG. 24

SET TIME OUT

TYPE OF NETWORK — 2400
- ⦿ LOW SPEED — 2401
- ○ HIGH SPEED — 2402

STATUS OF PERIPHERAL (1.0—200.0 SEC) — 2403 — 160.0 — 2404

STATUS OF LOCAL APPARATUS — 2405
   (1.0—160.0 SEC) — 40.0 — 2406

STATUS OF LOCAL PRINTER — 2407
      (1.0—40.0 SEC) — 10.0 — 2408

STATUS OF LOCAL SCANNER — 2409
      (1.0—40.0 SEC) — 10.0 — 2410

STATUS OF NETWORK APPARATUS — 2411
   (1.0—160.0 SEC) — 160.0 — 2412

STATUS OF NETWORK PRINTER — 2413
      (1.0—160.0 SEC) — 60.0 — 2414

STATUS OF NETWORK SCANNER — 2415
      (1.0—160.0 SEC) — 80.0 — 2416

STATUS OF APPARATUS FOR OTHER COMPUTER — 2417
(1.0—160.0 SEC) — 120.0 — 2418

STATUS OF PRINTER FOR OTHER COMPUTER — 2419
   (1.0—120.0 SEC) — 50.0 — 2420

STATUS OF SCANNER FOR OTHER COMPUTER — 2421
   (1.0—120.0 SEC) — 60.0 — 2422

CLOSE

INFORMATION PROCESSING APPARATUS, METHOD AND MEMORY MEDIUM THEREFOR

BACKGROUND OF THE INVENTION

1. Field of the Invention

The present invention relates to an information processing apparatus capable of acquiring status of peripheral apparatus.

2. Related Background Art

Recently there is realized a network system in which peripheral apparatus (printer, scanner, modem etc.) on the network can be shared by plural computers.

In such network system, it is rendered possible to acquire, from each computer, the status of each peripheral apparatus (for example an error state of the apparatus or whether the apparatus is currently in use).

The acquisition of the status of a peripheral apparatus on the network from a computer is executed by transmitting a command for status acquisition with a predetermined network protocol from the computer to the peripheral apparatus and by receiving a response to such command.

In such operation, there is set a time-out time for awaiting the response to the command. In case the response from the peripheral apparatus is not received until the lapse of such time-out time from the issuance of the command, the status acquisition is judged failed.

Such time-out value can be set for each peripheral apparatus or for each phenomenon generated in each peripheral apparatus.

In the above-described conventional example, however, in case the time-out value is to be changed for example according to the traffic amount in the network, the time-out values have to be changed individually.

For example, in case the time-out values can be set for six states, namely states A, B, C of a printer and states D, E, F of a scanner, and if it is desired to give a margin to the time-out value in order to avoid a time-out error resulting from an increase in the traffic amount in the network, it is required to change all the time-out values for the states A, B, C, D, E and F individually.

SUMMARY OF THE INVENTION

In consideration of the foregoing, the object of the present invention is to provide an information processing apparatus capable of easily setting parameters in acquiring various statuses from plural peripheral apparatus, and a method therefor.

The above-mentioned object can be attained, according to the present invention, by an information processing apparatus capable of acquiring various status information of plural peripheral apparatus on a network respectively from the supply sources of the status information, the apparatus comprising communication means for executing a communication protocol for acquiring the status information; designation means for designating status information to be acquired by each predetermined kind; acquisition means for acquiring the status information by the communication means from the supply source of the status information designated by the designation means; memory means for memorizing a parameter for executing the communication protocol for each kind that can be designated by the designation means; link means for linking plural parameters memorized by the memory means in the unit of a predetermined group; alteration means for altering the value of the parameter memorized by the memory means; and control means adapted, in case the value of the parameter is altered by the alteration means, to alter the value of a parameter linked with the altered parameter according to the content of such alteration.

Preferably the above-mentioned parameter includes a time-out time in the communication protocol and a settable range for such time-out time, and the control means is adapted to judge the load on the network based on the content of alteration by the alteration means and to increase or decrease the time-out time or the settable range therefor.

Also preferably the linking by the link means is executed in the unit of a group based on the kind of the peripheral apparatus.

Also preferably the above-mentioned group includes a group of printers and/or a group of scanners and/or a group of modems.

Also preferably the linking by the link means is executed in the unit of a group based on the kind of connection between the self apparatus and the peripheral apparatus.

Also preferably the above-mentioned group includes a network connection group in which the self apparatus and the peripheral apparatus are connected through the network, and a local connection group in which the self apparatus and the peripheral apparatus are connected directly.

Also preferably the above-mentioned network connection group includes a first group in which the peripheral apparatus is directly connected to the network and a second group in which the peripheral apparatus is connected through a gateway device to the network.

Other objects of the present invention, and the features thereof, will become fully apparent from the following description which is to be taken in conjunction with the accompanying drawings.

BRIEF DESCRIPTION OF THE DRAWINGS

FIG. 3 is a view showing a setting image in a first embodiment;

FIG. 20 is a view showing an example of a parameter setting image for information acquisition from a peripheral apparatus in a ninth embodiment;

FIGS. 21 and 22 are views showing examples of a parameter setting image for information acquisition from a peripheral apparatus in a tenth embodiment;

FIGS. 23 and 24 are views showing example of a parameter setting image for information acquisition from a peripheral in an eleventh embodiment.

DESCRIPTION OF THE PREFERRED EMBODIMENTS

Now the present invention will be clarified in detail by embodiments thereof, with reference to the accompanying drawings.

Figure 1:
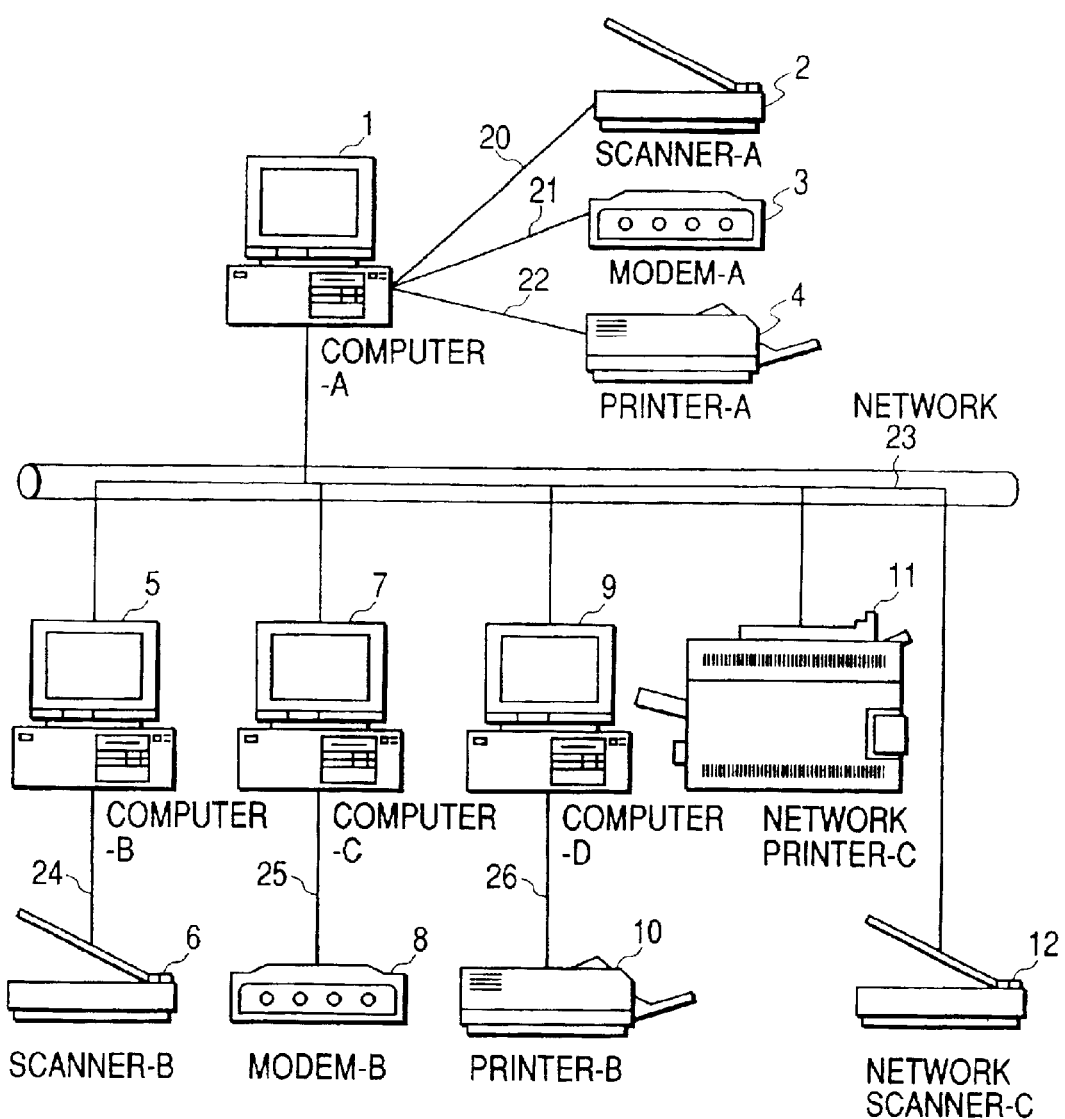
FIG. 1 is a view of a network in which plural peripheral apparatus are connected to computers.

FIG. 1 is a view showing the configuration of a network system in which connected is a computer constituting the information processing apparatus of the present invention. A computer A is connected by a local interface to a scanner A, a modem A and a printer A. The computer A is also connected, through the network, to a computer B, a computer C and a computer D, and is further connected, through these computers, to a scanner B, a modem B and a printer B. The computer A is further connected, through the network, to a network printer C and a network scanner C. The computer A can directly acquire the status of the scanner A, the modem A and the printer A. Also the computer A can acquire, through the network, the status of the scanner B, the modem B, the printer B, the network printer C and the network scanner C.

Figure 11:
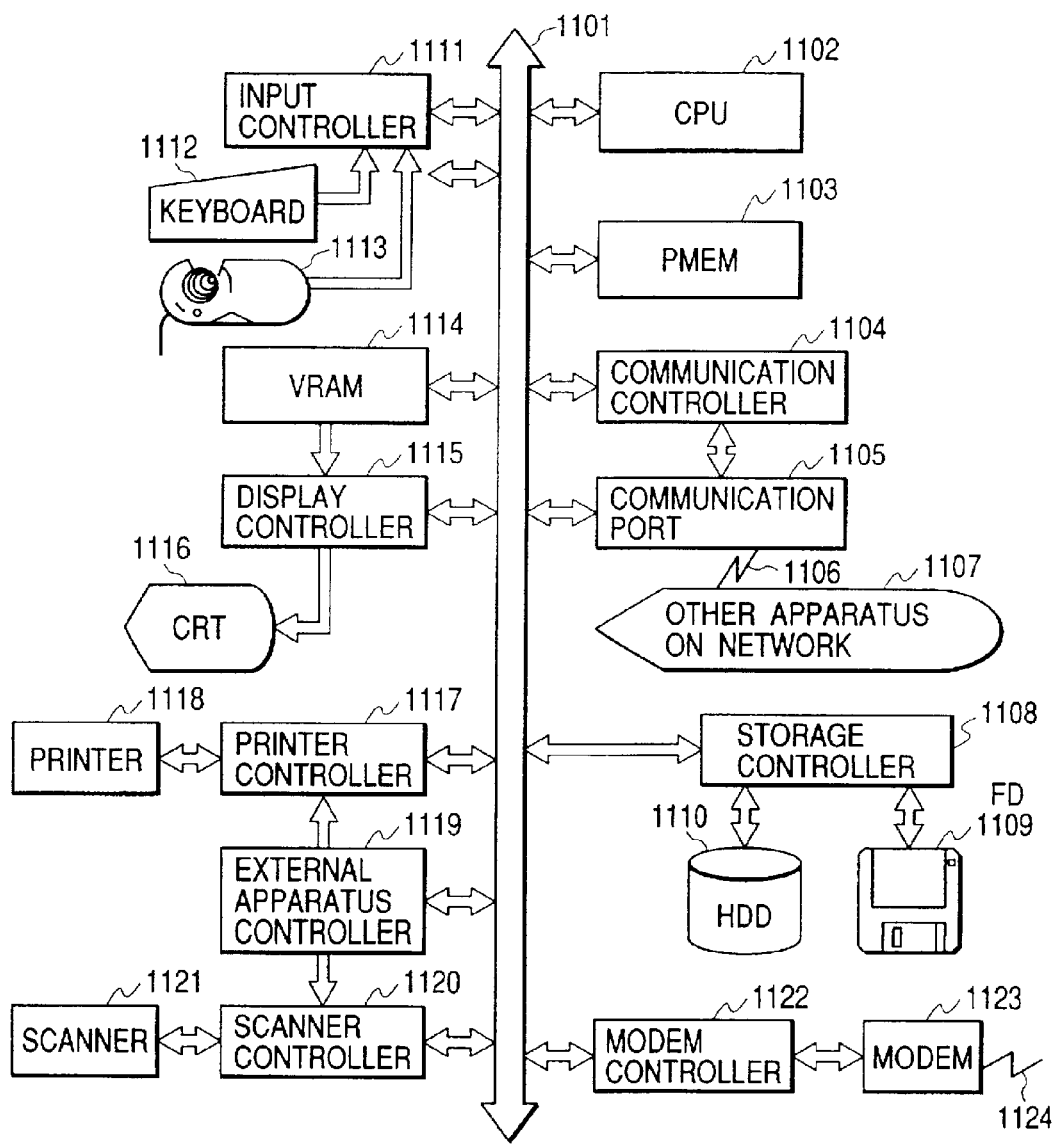
FIG. 11 is a view showing an example of computer configuration in this embodiment.

FIG. 11 shows an example of the configuration of the computer A, B or C.

A system bus 1101 connects a CPU 1102 controlling the entire apparatus with various blocks. A program for the present process is read from a hard disk 1110 and is loaded in a program memory (PMEM) 1103 for execution by the CPU 1102. Also data entered from a keyboard 1112 are stored as code information in the PMEM 1103 and are read by the CPU 1102.

A communication controller 1104 executes data exchange with another apparatus 1107 on the network 1106 through a communication port 1105. The communication port is also used for the status acquisition from a printer, a scanner etc. on the network.

An external memory controller 1108 controls the data writing and reading in a floppy disk (FD) 1109 and a hard disk (HD) 1110.

There are also provided a display unit such as a cathode ray tube (CRT) 1116, and a video image memory (VRAM) 1114. Drawing data (bit map data) to be displayed on the CRT 1116 are supplied through a display controller 1115 to the CRT 1116 and displayed thereon, whereby displayed is a setting image on which the user makes various settings.

An input/output controller 1111 is connected to input apparatus such as a keyboard 1112 and a mouse 1113. The user utilizes these input apparatus for instructing operations. For example, on the setting image displayed on the CRT 1116, the user can designate various objects on the setting image with a cursor controlled by the mouse 1113.

A printer controller 1117 controls the data output to a connected printer 1118. A scanner controller 1120 controls the image reading in a connected scanner 1121. An external apparatus controller 1119 controls the function of an external apparatus through the printer controller 1117 or the scanner controller 1120.

A modem controller 1122 controls a connected modem 1123, thereby executing data communication with a partner apparatus through a public line 1124. The modem 1123 is provided with a network control unit (NCU) for network control, and is thus capable of connection control with apparatus on the public line 1124.

Figure 13:
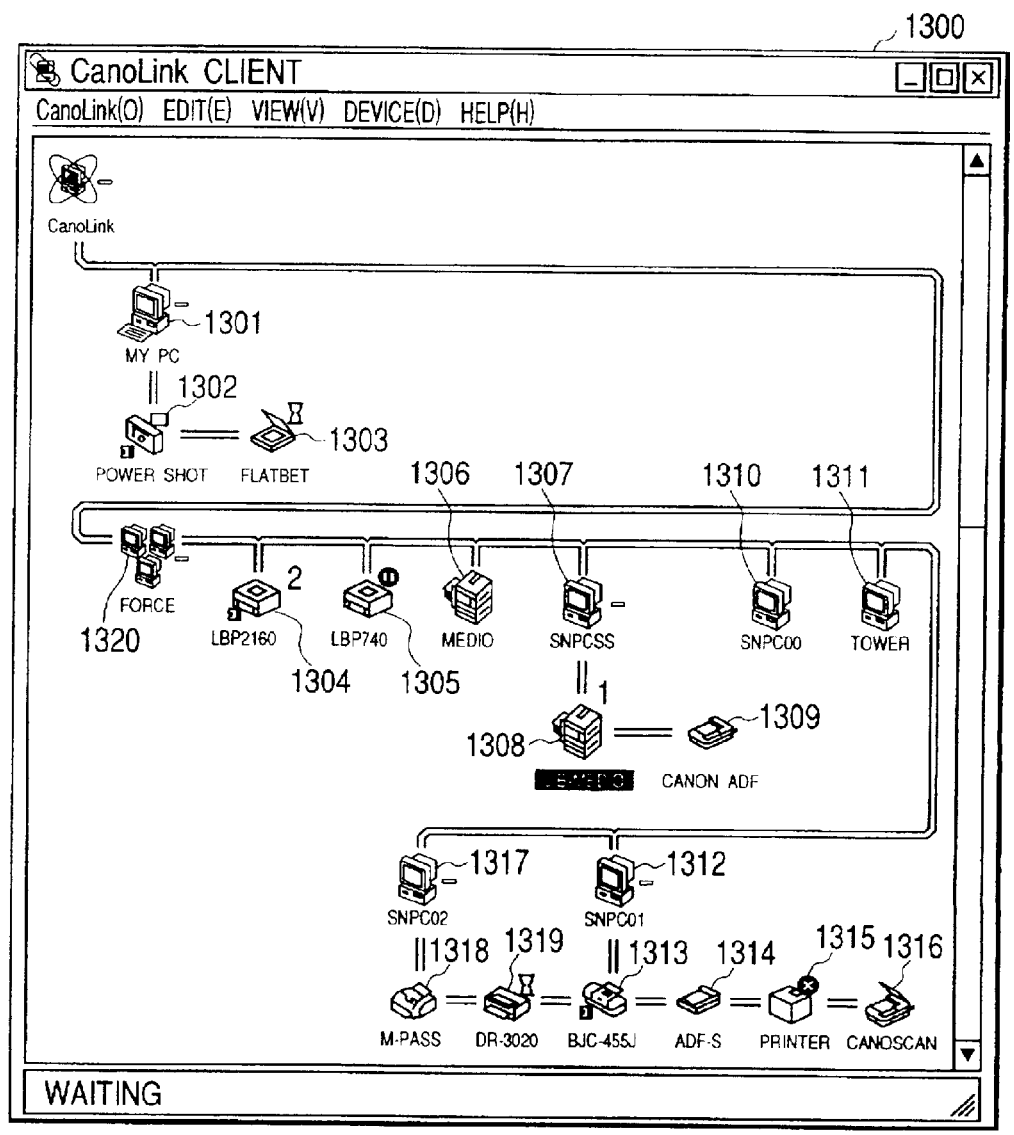
FIG. 13 is a view showing a setting image in this embodiment.
Figure 14:
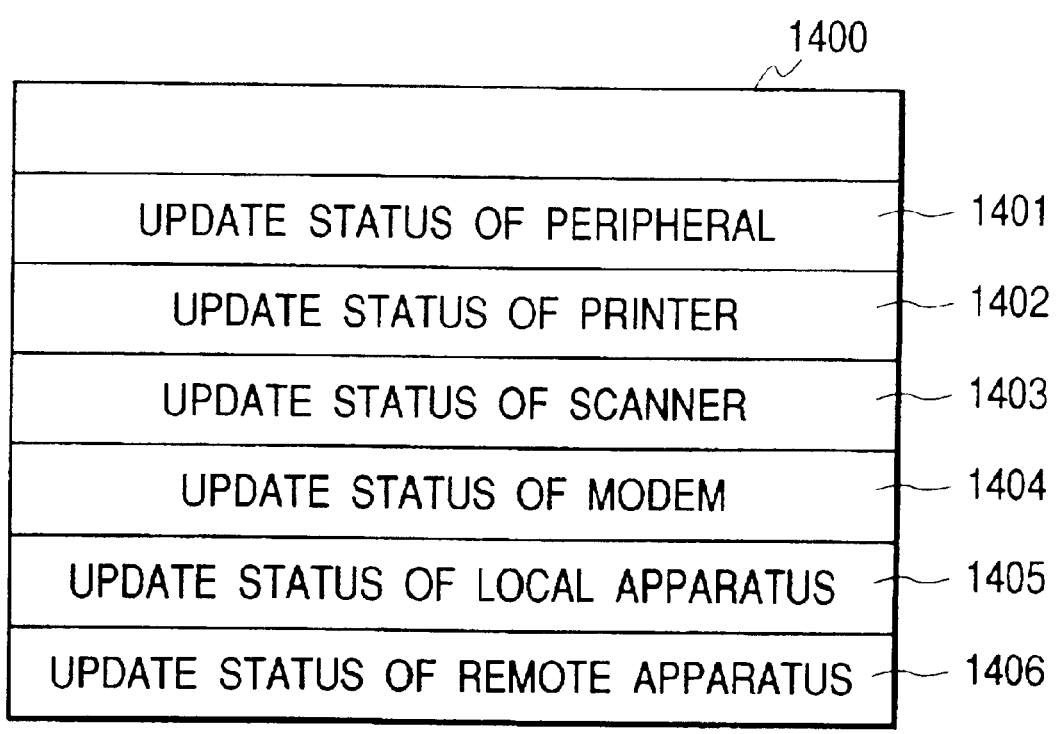
FIG. 14 is a view showing an example of operation menu display for instructing acquisition of the status of the peripheral apparatus in this embodiment.

Now reference is made to FIGS. 13 and 14 for explaining the user interface for the user of the computer A in acquiring the status of the apparatus on the network.

FIG. 13 shows an image 1300 displaying the network configuration, displayed on the CRT 1116. The status of the peripheral apparatus acquired by the user through the predetermined operation is reflected on this displayed image.

In the present embodiment, as shown in FIG. 13, each PC or peripheral apparatus present on the network is displayed by an icon, in order to facilitate visual recognition.

Icons 1301, 1307, 1310, 1311, 1317 and 1213 respectively indicate PC's. Also icons 1304, 1305, 1306, 1308, 1313, 1315 and 1318 respectively indicate printers. Also icons 1303, 1309, 1314, 1316 and 1319 respectively indicate scanners. An icon 1302 indicates a digital camera.

A numeral displayed at upper right of the icon 1304 or 1308 indicates the number of print jobs in a print waiting state in each printer. An hourglass mark at upper right of the icon 1303 or 1319 indicates that each scanner is currently in use. A mark at upper right of the icon 1305 indicates that the printer is currently in a stopped state, and a mark at upper right of the icon 1315 indicates that the printer is currently in an error state.

FIG. 14 shows an example of an operation menu display for the user of the computer A in instructing the status acquisition from a peripheral apparatus.

At first, when the user selects a menu button (not shown) on the CRT 1116 by the mouse 13, there is displayed a pull-down menu 1400. The selection of a menu 1401 instructs the renewal of the status of the entire peripheral apparatus on the network, while the selection of a menu 1402 instructs the renewal of the status on the printers on the network. Similarly, the selection of a menu 1403 instructs the renewal of the status on the scanners on the network, and the selection of a menu 1404 instructs the renewal of the status on the modems on the network.

Also the selection of a menu 1405 instructs the renewal of the status of peripheral apparatus locally connected to the computer A (for example the printer A shown in FIG. 1), and the selection of a menu 1406 instructs the renewal of the status of peripheral apparatus connected to the computer A through the network (for example the network printer C in FIG. 1).

In addition to the foregoing, there are provided menus for acquiring various statuses dependent on the peripheral apparatus, such as the acquisition of the remaining ink capacity in the printer, that of the power supply state in the printer, that of the line state of the modem etc.

The information of the peripheral apparatus, acquired by operating these menus is reflected on the network configuration display image 1300.

Figure 16:
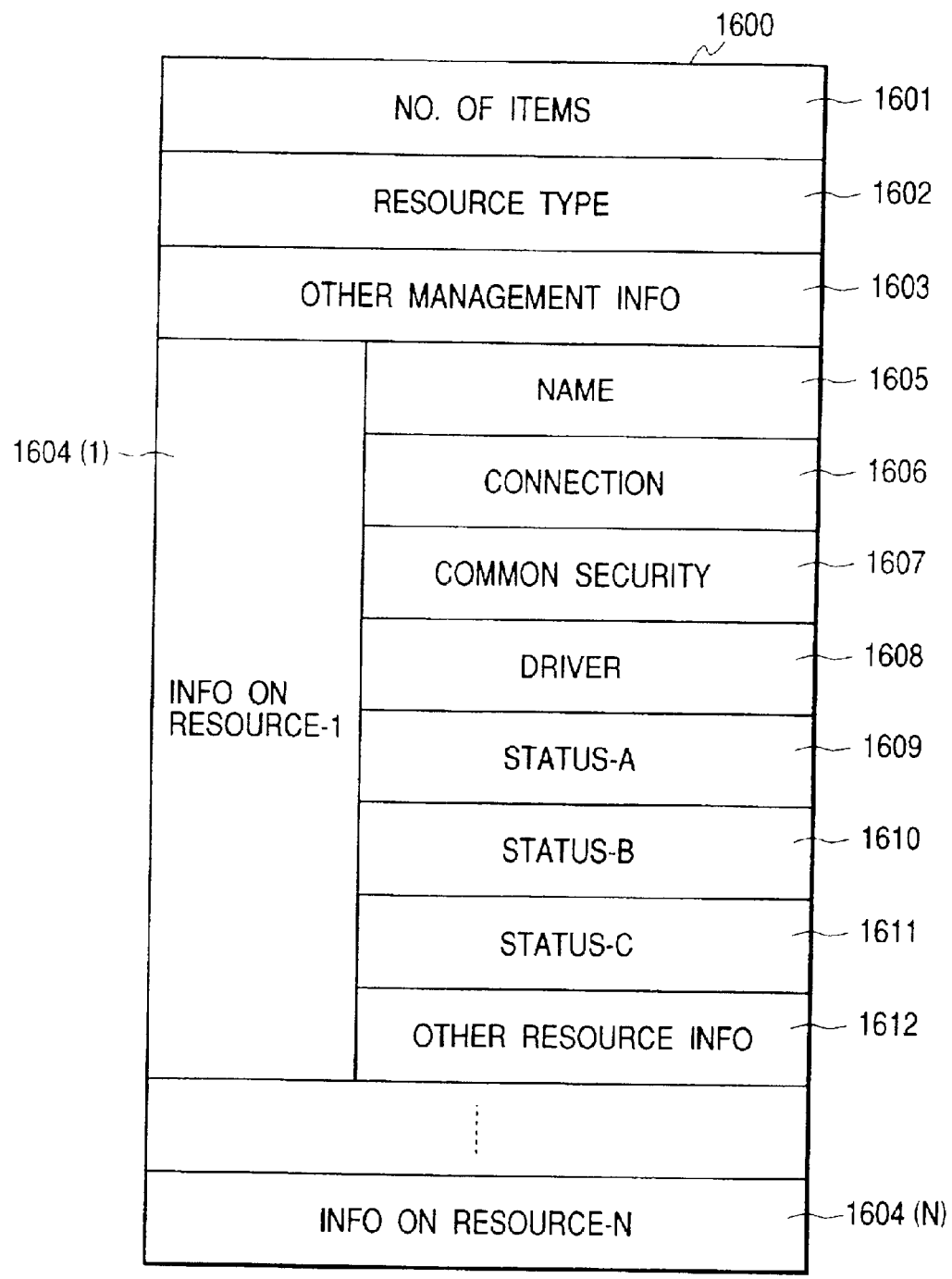
FIG. 16 is a view showing an example of the data structure for managing the status of the peripheral apparatus in this embodiment.

FIG. 16 shows an example of the data structure for managing the acquired status of the peripheral apparatus. The acquired information of the peripheral apparatus is managed by a resource information table 1600, for each kind of the resource, namely in the unit of printers, in the unit of scanners etc.

Information 1601 indicates the number of items of the information managed in the resource management table 1600.

Information 1602 indicates the kind of resource (printer, scanner, modem etc.) managed in the resource management table 1600. Information 1603 indicates other management information in the resource management table 1600.

Information 1604(1)~1604(N) are information on the respective resources and have similar structures.

For example, the information 1604(1) relates to a resource (1) and includes information 1605~1612.

Information 1605 indicates the name of the resource (1).

Information 1606 indicates the form of connection, and stores information whether the resource (1) is connected to the self apparatus by local connection or by network connection. For example, to the computer A in the network system shown in FIG. 1, the printer A is connected by local connection, and the network computer C is connected by network connection.

Information 1607 is shared security information in case the resource (1) is set to be shared on the network. Based on this information 1607, it is determined to whom the resource (1) is to be made available.

Information 1608 is driver information for the resource (1). Information 1609, 1610, 1611 store the status information acquired from the resource (1), including status information such as on/off state of the power supply, number of jobs currently in process error state of the resource (1) etc.

Information 1612 is other resource information of the resource (1).

In the following there will be explained the function of the computer A in acquiring the status from the peripheral apparatus, with reference to a flow chart shown in FIG. 12.

The sequence is activated when the user starts the status acquisition from the peripheral apparatus by a menu operation shown in FIG. 14.

A step S1201 transmits a command for status acquisition to a desired peripheral apparatus by a predetermined network protocol. For example a GET command is issued in case the HTTP (hyper text transfer protocol) is employed as the network protocol.

A step S1202 starts a timer in which a time-out value is set for awaiting a response to the command.

As the time-out values corresponding to the operation menus 1401~1406 shown in FIG. 14 are stored in the HDD 1110, a time-out value corresponding to the menu selected among those 1401~1406 is read from the HDD 1110 and is set in the timer in the step S1202.

A step S1203 discriminates whether the timer has reached the above-mentioned time-out value, and, if not, the sequence proceeds to a step S1204.

A step S1204 discriminates whether a response has been received from the peripheral apparatus to which the command has been issued, and, if not, the sequence returns to the step S1203, but, if received, the sequence proceeds to a step S1205.

A step S1205 executes a renewal process for the status of the peripheral apparatus, based on the received response. More specifically, the status information for each peripheral apparatus, stored for example in the HDD 1110, is renewed according to the received response.

If the step S1203 identifies that the timer has reached the time-out value, the sequence proceeds to a step S1206 for executing an error process, whereupon the sequence is terminated.

The status acquisition process of the above-described steps S1201~S1206 is executed for each peripheral apparatus corresponding to the menu operation shown in FIG. 14.

For example, in case the menu 1401 is selected, the above-described process is executed for all the peripheral apparatus present on the network.

Also, in case the menu 1402 is selected, the above-described process is executed for the printers (4, 10, 11 in FIG. 1) on the network.

Also, in case the menu 1403 is selected, the above-described process is executed for the scanners (2, 6, 12 in FIG. 1) on the network, and, in case the menu 1404 is selected, the above-described process is executed for the modems (3, 8 in FIG. 1) on the network.

Also, in case the menu 1405 is selected on the computer A shown in FIG. 1, the above-described process is executed for the apparatus (2, 3, 4 in FIG. 1) locally connected to the computer A, and, in case the menu 1406 is selected, the above-described process is executed for the apparatus (11, 12 in FIG. 1) remote connected to the computer A.

The status information acquiring operation based on the above-described flow chart is activated by a menu operation by the user, but it may also be activated as a process periodically executed on the computer A.

In the following there will be explained first to sixth embodiments of the setting image, which is used by the user for setting the time-out value to be used in the aforementioned step S1202.

The setting image for setting the time-out value is activated by a predetermined operation of the user and is displayed on the CRT 1116. The user changes the values on the setting image, by means of the keyboard 1112 or the mouse 1113.

For the time-out value to be set by the user, there exists a settable range (upper limit and lower limit). Therefore, for each status acquisition, there exist a time-out value to be set and a settable range as a parameter set, which is stored in a memory such as the HDD 1110.

Figure 17:
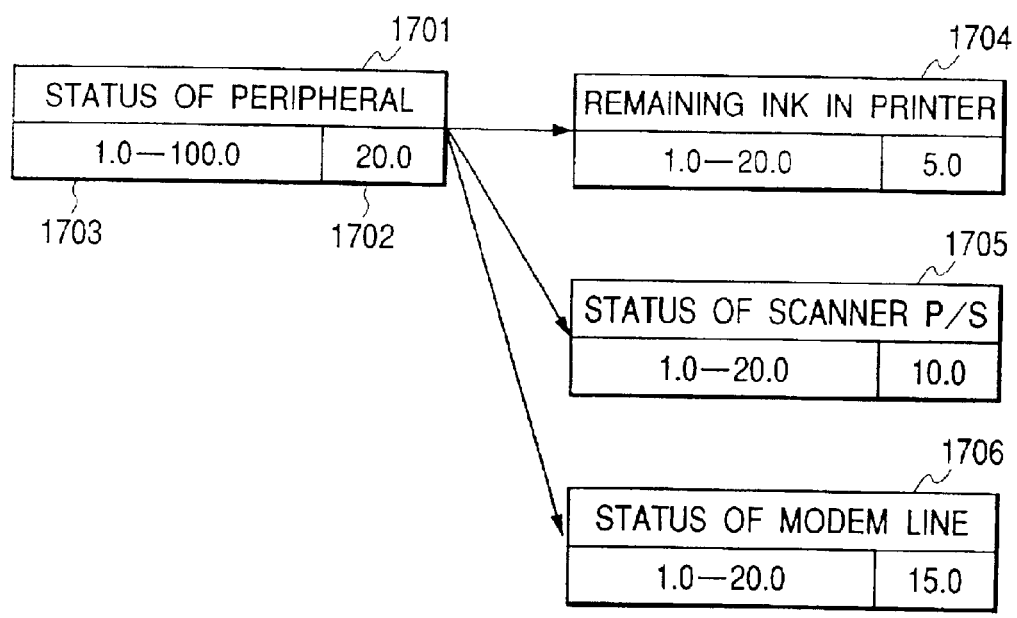
FIG. 17 is a view showing an example of linking of the parameter set in the status acquisition in this embodiment.

The parameter sets corresponding to the various status acquisitions, stored in the HDD 1110, are mutually linked according to a specified rule. FIG. 17 shows an example of such linking, wherein a parameter set 1701 for acquiring the status of the peripheral apparatus is linked with a parameter set 1704 for acquiring the remaining ink capacity of the printers, a parameter set 1705 for acquiring the power supply status of the scanners, and a parameter set 1706 for acquiring the line status of the modems.

The parameter set 1701 includes a time-out value 1702 and a settable range 1703 therefor. Also the parameter sets 1704, 1705, 1706 have a similar structure.

In case a changing operation is executed on the parameter set 1701, the parameter sets influenced by such changing operation are judged from the linking shown in FIG. 17. As a result, the parameter sets 1704, 1705, 1706 are changed according to the content of change of the aforementioned changing operation.

In the following there will be explained variations of the basic embodiment explained in the foregoing.

[First Embodiment]

In the first embodiment, the change in the time-out value for status acquisition by the user is reflected on the settable ranges for other time-out values linked with the above-mentioned time-out value.

Figure 2:
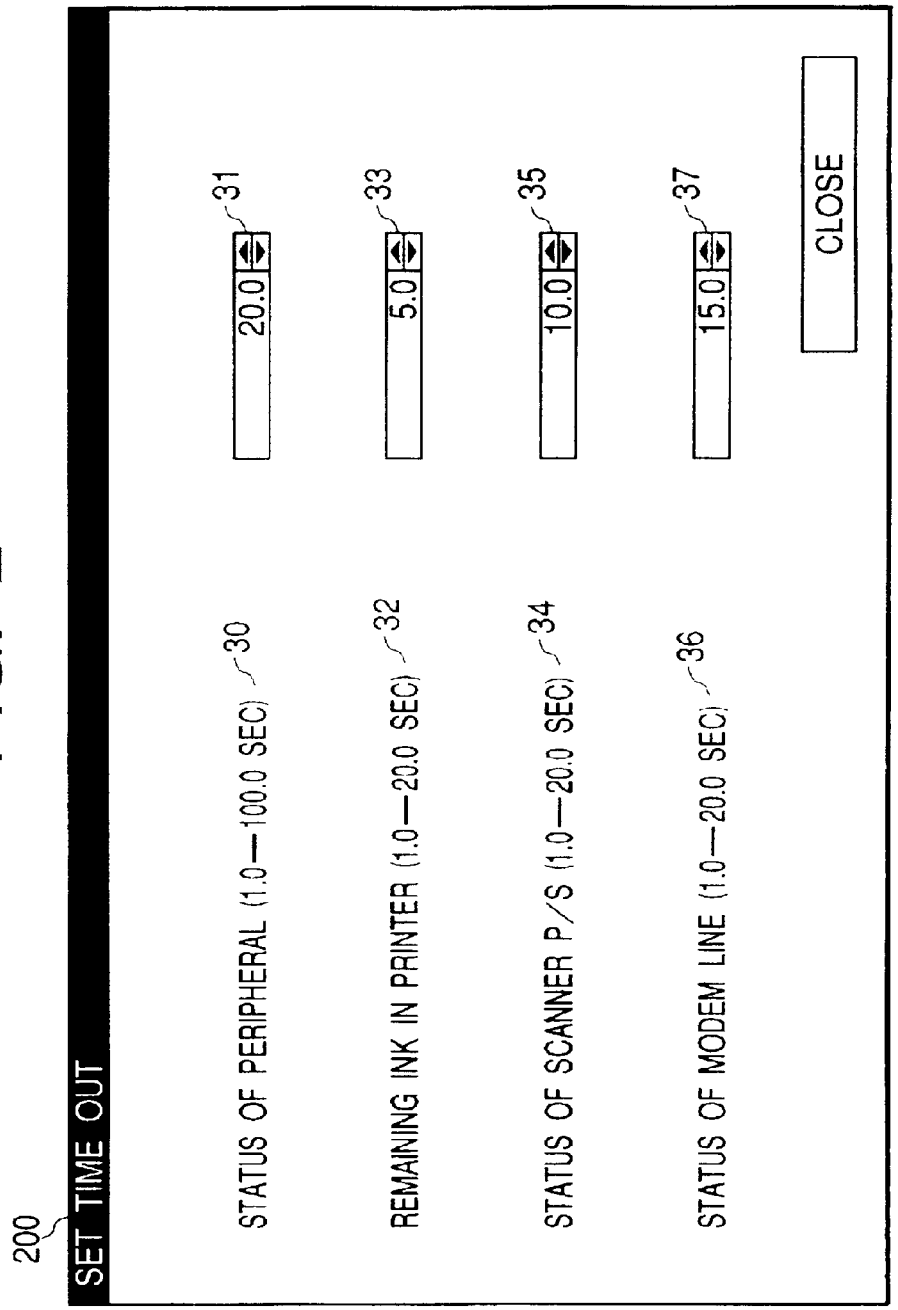
FIG. 2 is a view showing a setting image in a first embodiment.

The following explained is made with reference to FIGS. 2 and 3. FIG. 2 shows a time-out value setting image 200 (prior to the change of the time-out value) for setting the time-out value in acquiring the status from the peripheral apparatus by the user of the computer A, and FIG. 3 shows the same time-out value setting image 300 (after the change of the time-out value).

In the setting image 200, there are provided controls 31, 33, 35, 37 for entering set values, respectively corresponding to a time-out value 30 for acquiring all the status of the peripheral apparatus, a time-out value 32 for acquiring the remaining ink amount in the printer, a time-out value 34 for acquiring the power supply status in the scanner and a time-out value 36 for acquiring the line status in the modem.

For the controls there are respectively provided settable ranges for the entered values, as represented by text information 30, 32, 34, 36.

The time-out value 31 set by the control 31 for acquiring the all the status of the peripheral apparatus is selected as 20.0 seconds, and is same to the upper limit values of the texts 32, 34, 36 indicating the settable ranges for the respective time-out values, and the upper limit values of the time-out values to be set by the controls 33, 35, 37 are also 20.0 seconds.

When the set value of the control 31 is changed, the setting image 200 changes to a display state as shown in the setting image 300, indicating most briefly the feature of the present invention. More specifically, when the user changes the time-out value for the entire status acquisition for the peripheral apparatus from 20.0 seconds to 50.0 seconds by the control 31, the upper limit values of the texts 32, 34, 36, indicating the settable range of the respective time-out values, are also changed from 20.0 seconds to 50.0 seconds, and the upper limit values of the time-out values settable by the controls 33, 35, 37 are also changed to 50.0 seconds.

It is to be noted that the computer A judges the above-mentioned increasing change of the time-out value (control 31) as "an increase of the time-out value by the user in order to prevent the time-out error resulting from an increased load of the network" and changes the texts 32, 34, 36, linked with the control 31, in a direction to prevent the time-out error, namely in a direction of increasing the upper limit values. This is also same in the following second to sixth embodiments.

The computer A also judges the rate of increase of the above-mentioned time-out value (control 31) as a measure indicating the level of increase of the load of the network, and applies such rate of increase to the changes of the texts 32, 34, 36 linked with the control 31.

In the first embodiment, as explained in the foregoing, a change in the time-out value for the status acquisition by the user is reflected on the settable ranges of the time-out values for other status acquisition linked with the above-mentioned time-out value, so that the burden of operation in changing the time-out value according to the load of the network can be significantly alleviated.

Also the increase in the time-out value by the user is judged as the increase in the load of the network, so that the plural parameters can be automatically changed according to the load of the network, without relying on a complicated configuration such as monitoring the traffic amount in the network.

[Second Embodiment]

In the second embodiment, in response to the change of the settable ranges of other time-out values in the first embodiment, such other time-out values are so changed as to be contained in thus changed settable ranges.

Figure 4:
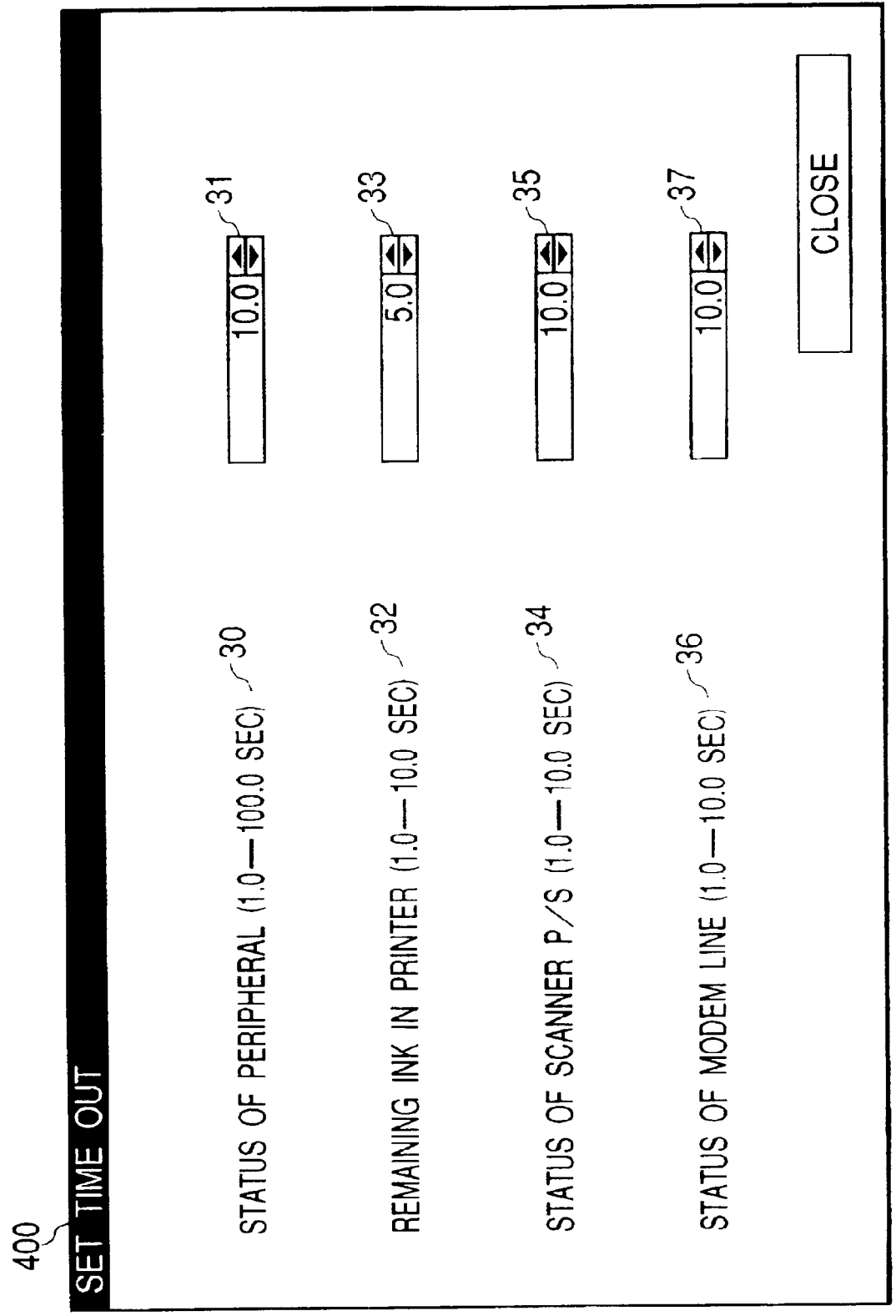
FIG. 4 is a view showing a setting image in a second embodiment.

Now reference is made to FIG. 4, showing the setting image displayed after the set value of the control 31 is changed in the setting image 200 in FIG. 2.

When the user changes the time-out value for the entire status acquisition for the peripheral apparatus from 20.0 seconds to 10.0 seconds by the control 31, the upper limit values of the texts 32, 34, 36, indicating the settable range of the respective time-out values, are also changed from 20.0 seconds to 10.0 seconds, and the upper limit values of the time-out values settable by the controls 33, 35, 37 are also changed to 10.0 seconds.

In such state, the value set by the control 37 exceeds the upper limit value of the settable range 36, so that such setting is automatically changed to the upper limit value of 10.0 seconds.

In the second embodiment, as explained in the foregoing, in response to the change of the settable ranges of other time-out values according to the first embodiment, such other time-out values are so changed as to be contained in thus changed settable ranges, thereby preventing contradicting relationship between the set value and the settable range.

[Third Embodiment]

In the third embodiment, a change in the time-out value for status acquisition by the user is reflected on the set values of other time-out values linked with the above-mentioned time-out value.

Figure 5:
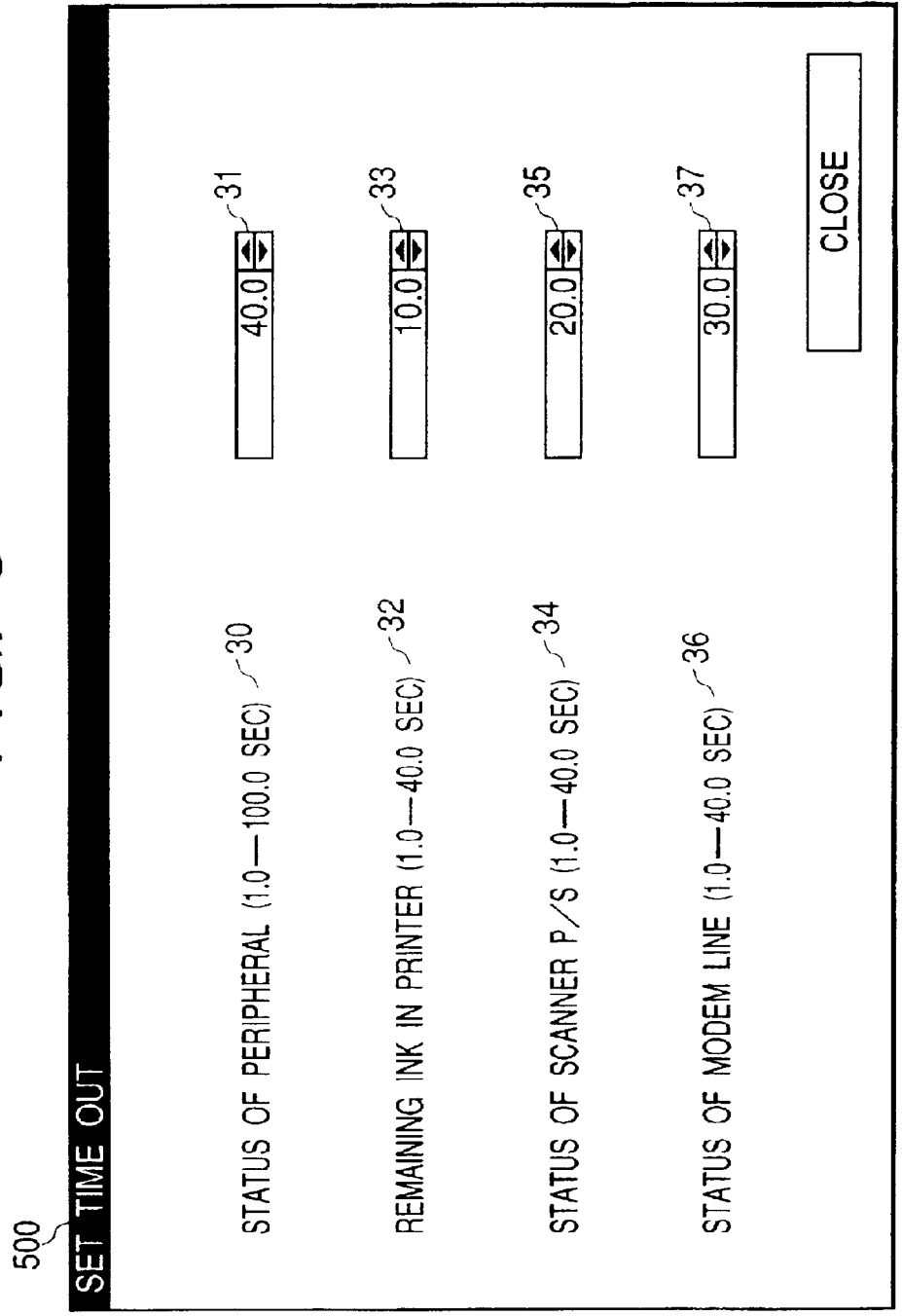
FIG. 5 is a view showing a setting image in a third embodiment.

Now reference is made to FIG. 5, indicating the setting image displayed in case the set value of the control 31 is changed.

When the user changes the time-out value for the entire status acquisition for the peripheral apparatus from 20.0 seconds to 40.0 seconds by the control 31, the upper limit values of the texts 32, 34, 36, indicating the settable range of the respective time-out values, are also changed from 20.0 seconds to 40.0 seconds, and the upper limit values of the time-out values settable by the controls 33, 35, 37 are also changed to 40.0 seconds.

In such state, the set values of the controls 33, 35, 37 are automatically reset to values, calculated according to the rates of changes of the respective upper limit values. In the present example, as the upper limit value is doubled, the set time-out values are respectively doubled to 10.0, 20.0 and 30.0 seconds.

Stated differently, when the user increases the time-out value in order to prevent the time-out error resulting from the increase in the traffic amount in the network, the set time-out values linked with the above-mentioned time-out value are also changed in a direction for preventing the generation of the time-out error, namely in a direction for increasing the set values.

In the third embodiment, as explained in the foregoing, the change in the time-out value for the status acquisition by the user is reflected on the set values of other time-out values linked with the above-mentioned time-out value, so that the user can be significantly relieved from the burden of individually changing the plural time-out values.

[Fourth Embodiment]

In the fourth embodiment, the linking for reflecting the change in the foregoing third embodiment is executed according to the kind of the peripheral apparatus.

Figure 6:
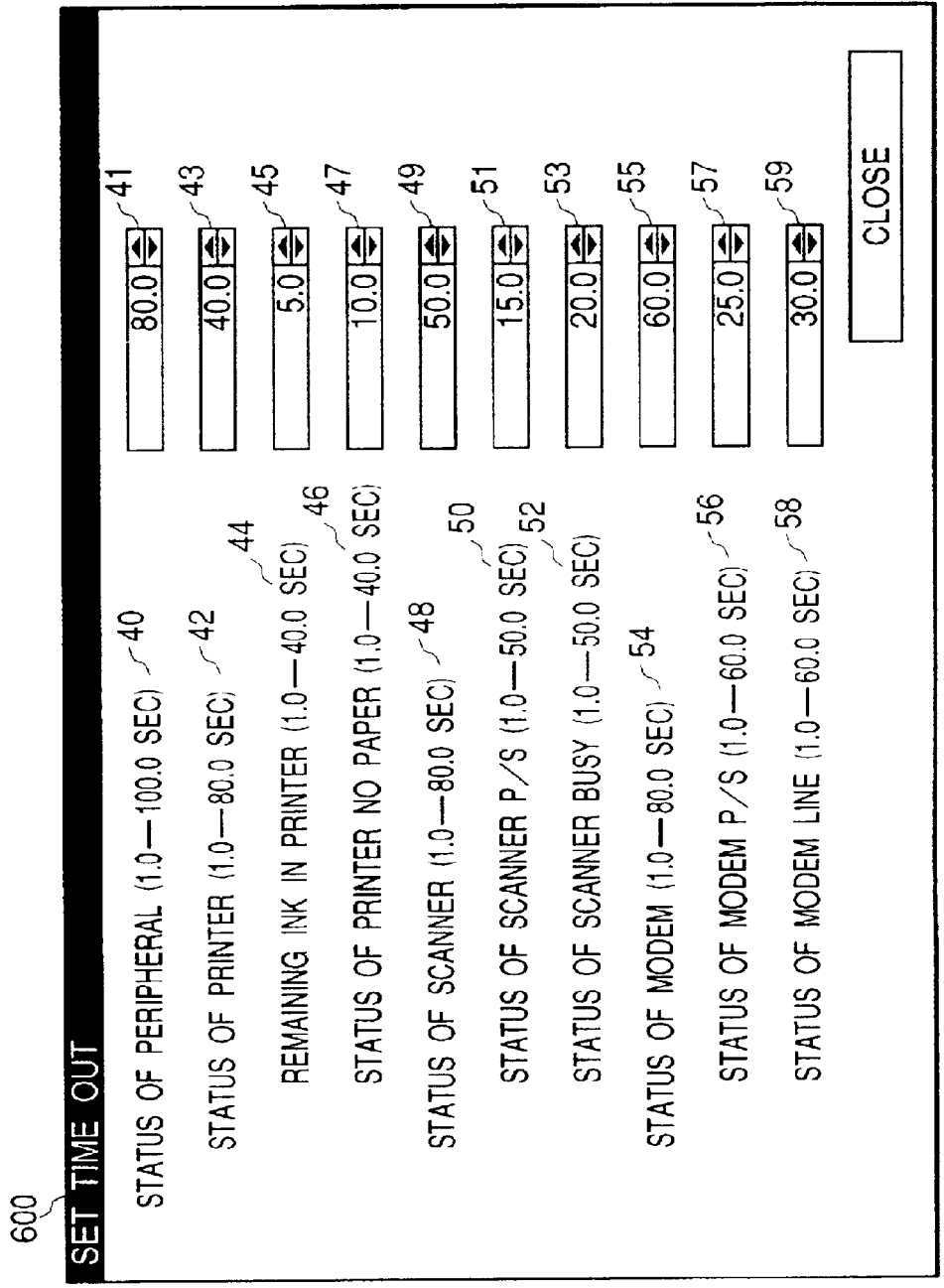
FIG. 6 is a view showing a setting image in a fourth embodiment.
Figure 7:
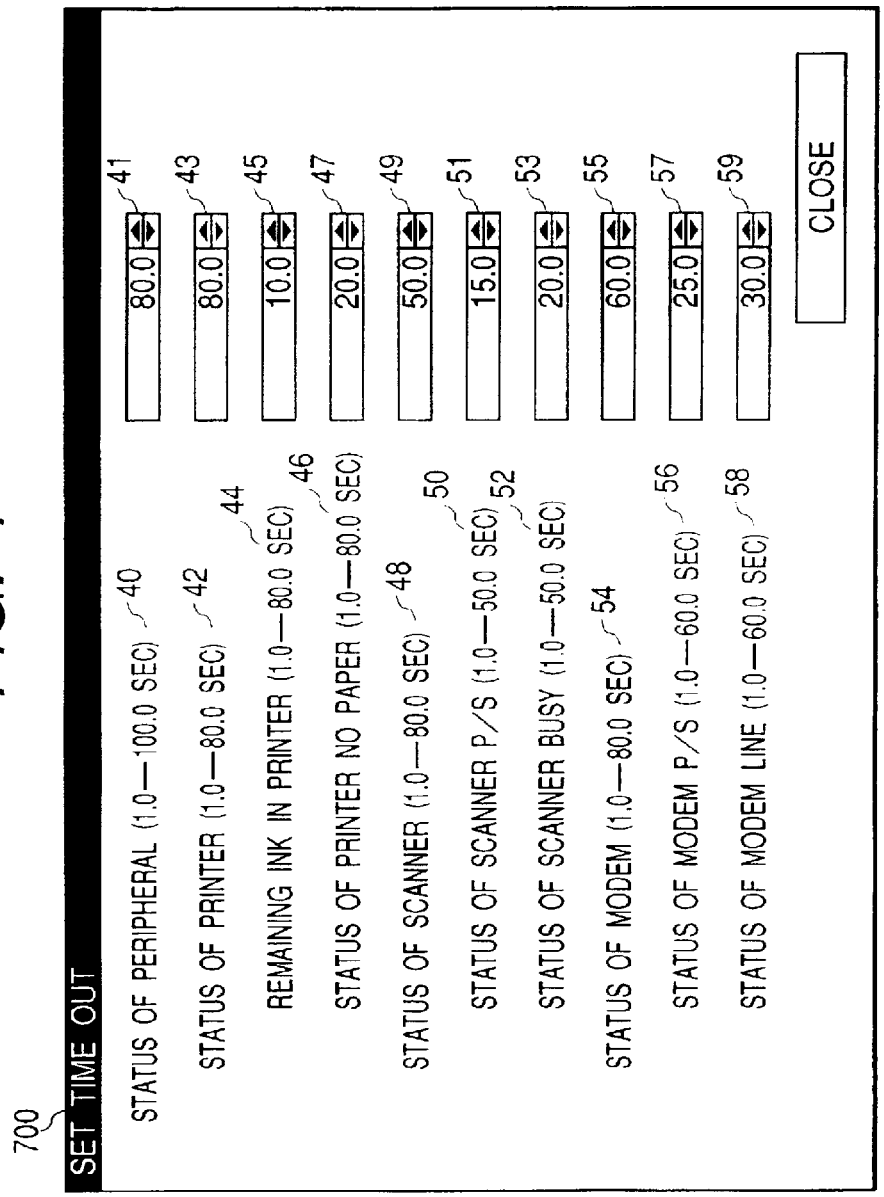
FIG. 7 is a view showing a setting image in a fourth embodiment.

Now reference is made to FIGS. 6 and 7, wherein FIG. 6 shows a setting image 600 prior to the change of the time-out value, while FIG. 7 shows a setting image 700 after the change of the time-out value.

Referring to FIG. 6, the upper limit values of texts 44, 46 are same as the set value of a control 43, while the upper limit values of texts 50, 52 are same as the set value of a control 49, the upper limit values of texts 56, 58 are same as the set value of a control 55, and the upper limit values of texts 42, 48, 54 are same as the set value of a control 41. Thus the set time-out values are grouped by the kinds of the peripheral apparatus, and the set value for a group constitutes the upper limit value of the settable range for the time-out value for each status acquisition in such kind.

When the time-out value for acquiring the status of the printer is doubled to 80.0 seconds by the control 43, there is displayed the setting image 700.

In the setting image 700, the upper limit values of the texts 44, 46 are also changed to 80.0 seconds, and the set values of the controls 45, 47 are automatically doubled respectively to 10.0 seconds and 20.0 seconds.

In the fourth embodiment, as explained in the foregoing, the linking for reflecting the change in the foregoing third embodiment is executed according to the kind of the peripheral apparatus, so that the user can adjust the time-out value without paying attention to the detailed time-out value of each peripheral apparatus.

Also the change in the time-out value is reflected only to an extent grouped by the kind of the peripheral apparatus, so that the time-out value can be set, by a simple operation, for each peripheral apparatus such as the printer or the scanner, matching the characteristics thereof.

[Fifth Embodiment]

In the fifth embodiment, slider controls are added to the setting image of the foregoing fourth embodiment, in order to improve the convenience of operation of the user.

Figure 8:
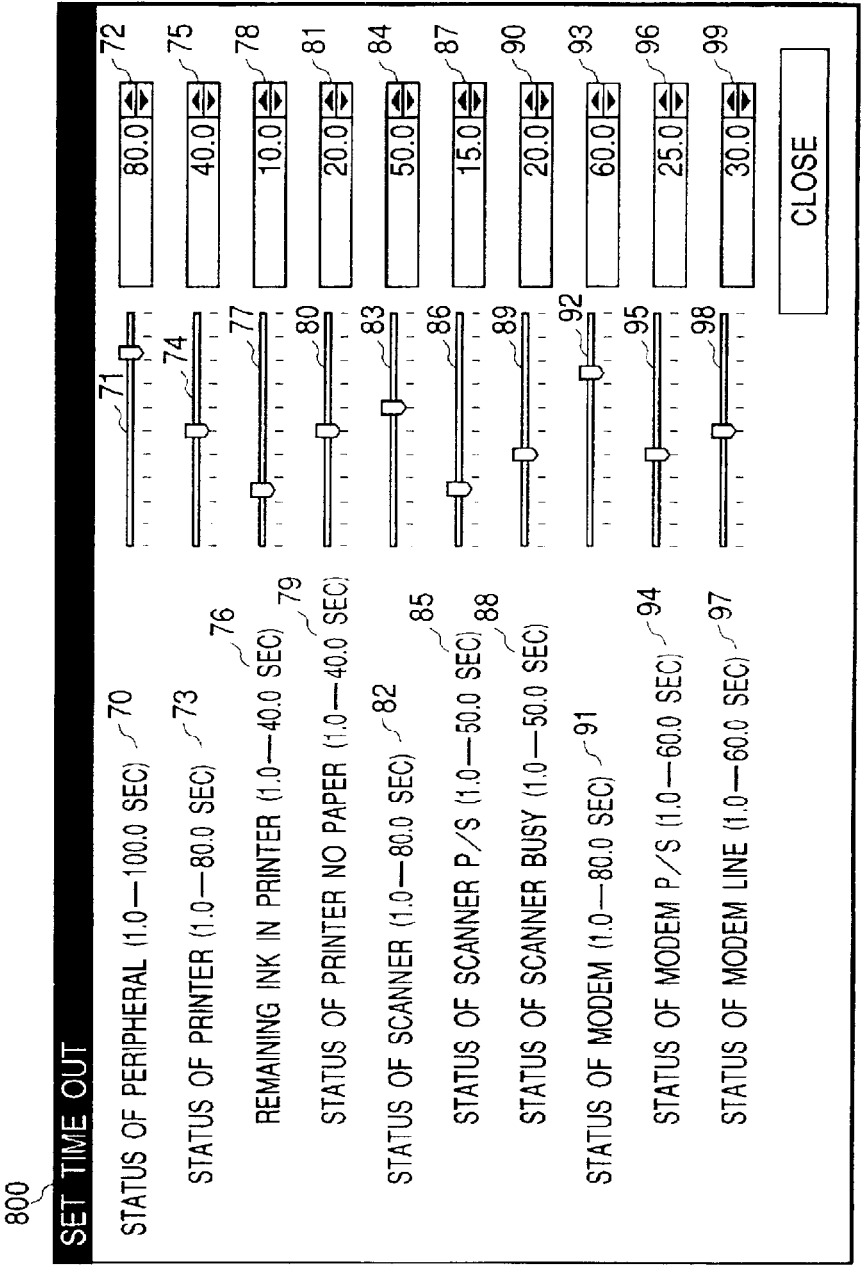
FIG. 8 is a view showing a setting image in a fifth embodiment.
Figure 9:
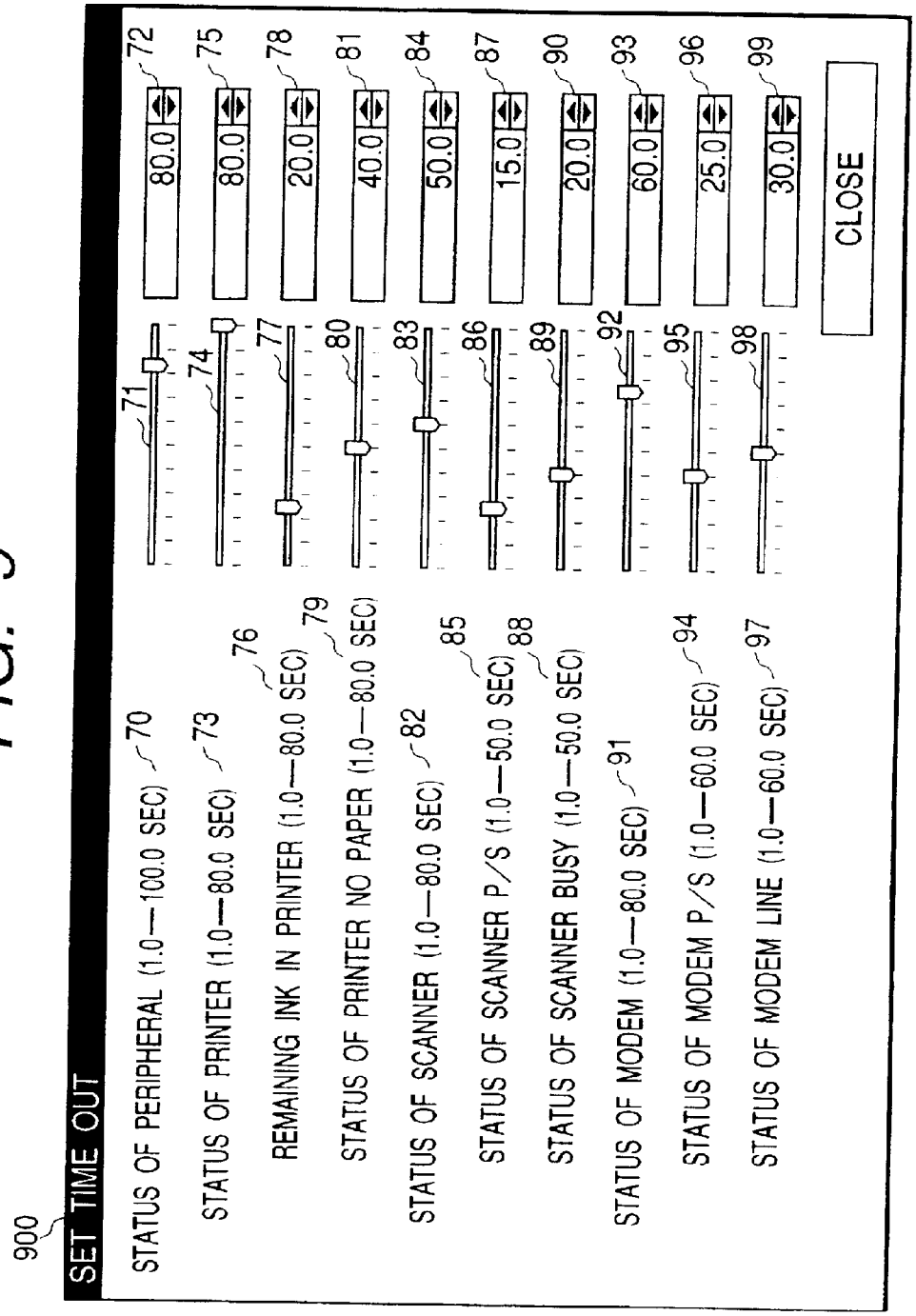
FIG. 9 is a view showing a setting image in a fifth embodiment.

Now reference is made to FIGS. 8 and 9, wherein FIG. 8 shows a setting image 800 prior to the change of the time-out values, while FIG. 9 shows a setting image 900 after the change of the time-out values.

In the setting image 800, when the time-out value for the printer status acquisition is shifted by a slider control 74 to the right-hand end position, namely to the upper limit value, the set value of a control 75 is changed to the upper limit value of 80.0 seconds. In response the upper limit values of texts 76, 69 are changed to 80.0 seconds, and the set values of controls 78, 81 are also respectively doubled to 20.0 and 40.0 seconds. As the set value is calculated by the ratio to the upper limit value, slider controls 77, 80 are not affected. This setting image allows the user to adjust the time-out value of the entire status acquisition for the printer, without paying attention to the time-out values for the entire status acquisition for the peripheral apparatus or to the time-out value for the detailed status acquisition of the printer.

In the fifth embodiment, as explained in the foregoing, a slider control is added to the time-out value setting image to improve the operability of the user.

[Sixth Embodiment]

In contrast to the foregoing fourth embodiment in which the linking for reflecting the change in the time-out value is based on the kind of the peripheral apparatus, the present sixth embodiment executes linking for reflecting the change in the time-out value, based on the connection state of the peripheral apparatus.

Figure 10:
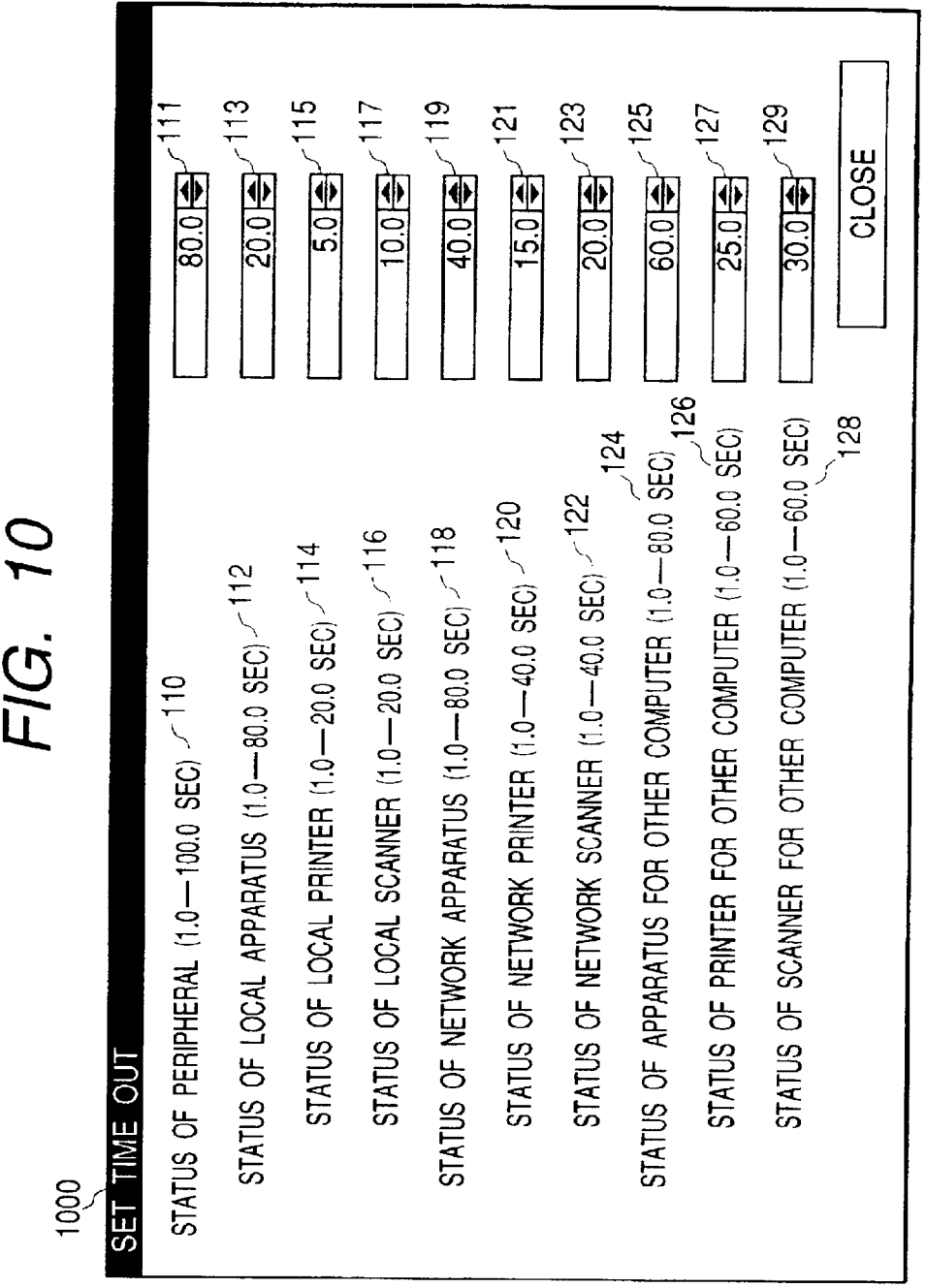
FIG. 10 is a view showing a setting image in a sixth embodiment.
Figure 15:
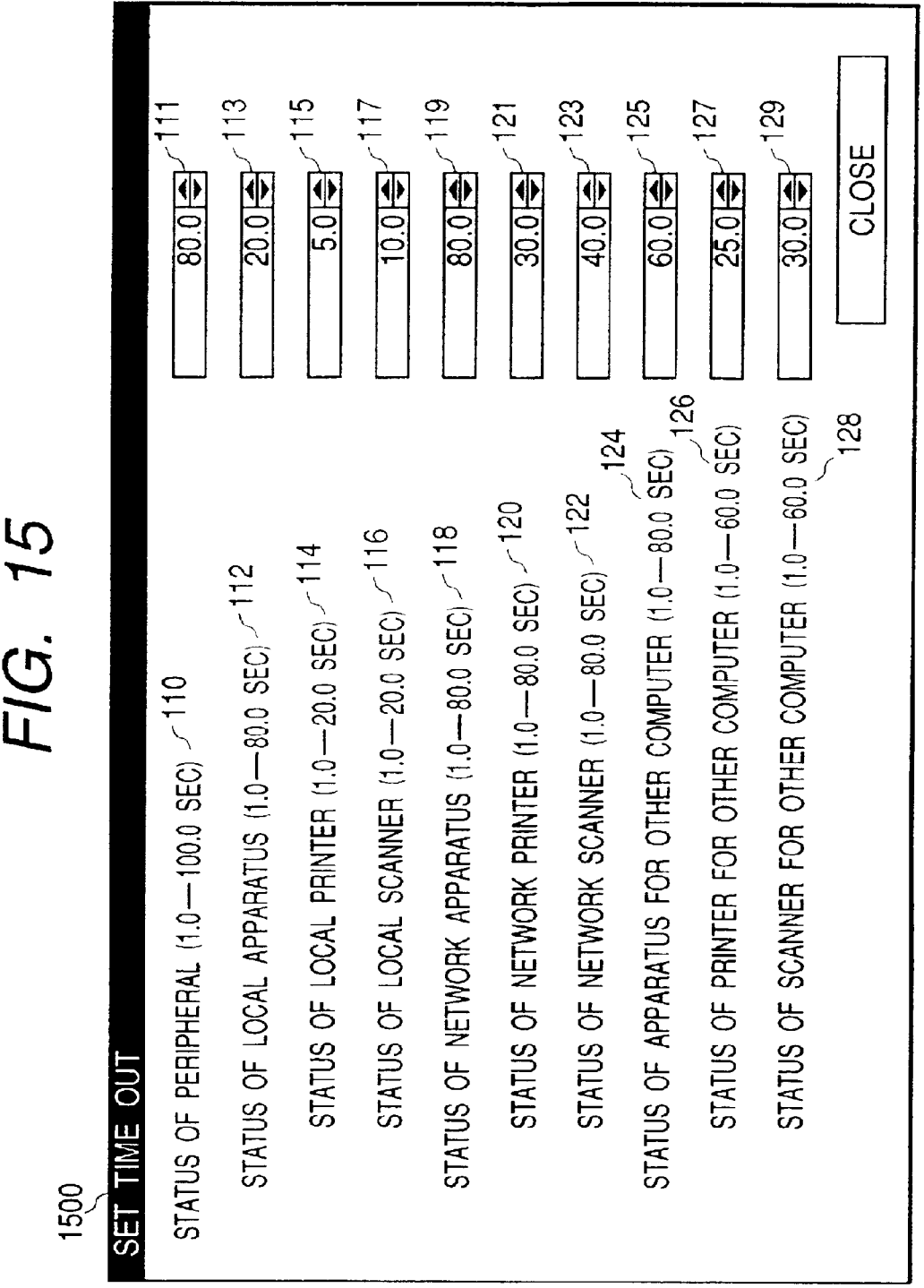
FIG. 15 is a view showing a setting image in a sixth embodiment.

Now reference is made to FIGS. 10 and 15, wherein FIG. 10 shows a setting image 1000 prior to the change of the time-out value while FIG. 15 shows a setting image 1500 after the change of the time-out value.

The "local apparatus" in FIG. 10 is the scanner A, modem A and printer A in FIG. 1, and the "network apparatus" is the network printer C and network scanner C in FIG. 1.

Also the "apparatus for other computers" in FIG. 10 is the computer A in FIG. 1 and the scanner B, modem B and printer B which are connected through the network and other computers.

Referring to FIG. 10, the upper limit values of texts 114, 116 are same as the set value of a control 113, while the upper limit values of texts 120, 122 are same as the set value of a control 119, the upper limit values of texts 126, 128 are same as the set value of a control 125, and the upper limit values of texts 112, 118, 124 are same as the set values of a control 111.

Thus the set time-out values are grouped according to the kind of connection of the peripheral apparatus, and the set value for a group constitutes the upper limit value for the time-out value setting for each status acquisition for the kind.

In the setting image 1000, when the time-out value for status acquisition for the network apparatus is doubled by the control 119 to 80.0 seconds, there is displayed a setting image 1500 in which the upper limit values of the texts 120, 122 are also changed to 80.0 seconds while the set values of the controls 121, 123 are also doubled respectively to 30.0 and 40.0 seconds.

In the sixth embodiment, as explained in the foregoing, the linking for reflecting the change in the time-out value is based on the type of connection of the peripheral apparatus, so that the time-out value can be set by a simple operation for each type of connecting such as the network connection or local connection, matching the characteristic thereof.

[Seventh Embodiment]

The seventh embodiment relates to the storage, in a computer readable memory medium, of the parameters displayed on the setting image of the sixth embodiment shown in FIG. 15.

Figure 18:
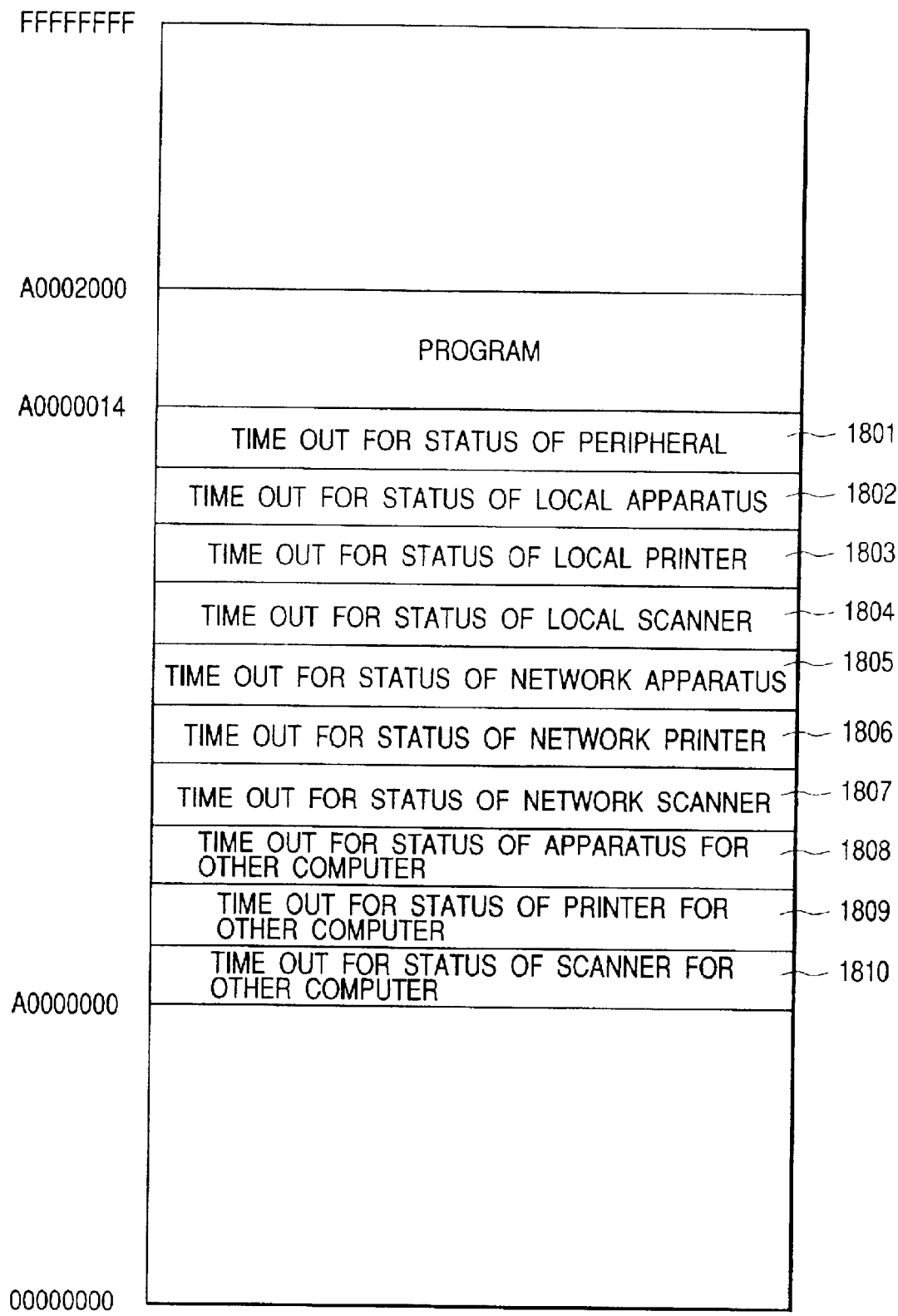
FIG. 18 is a view showing an example of memory map in case the parameters for information acquisition are stored in a computer readable memory medium.

FIG. 18 shows the mode of storage of the time-out values for the parameters on the setting image shown in FIG. 15, in a computer memory. In a 32-bit memory space 00000000~FFFFFFFF, the time-out values are stored respectively by 2 bytes, starting from an address A0000000 up to an address A0000014. The stored values are stored completely independently, and are mutually linked according to the type of connection of the peripheral apparatus by a program stored in addresses A0000014 to A000200, for the process of the foregoing embodiment. The addresses mentioned above are merely an example, and the present invention is effective irrespective of the actual addresses. For example the set values may be stored starting from an address B0000000 instead of the A0000014, and the memory space may also be a 64-bit memory space.

[Eighth Embodiment]

The eighth embodiment executes linking of the plural time-out values for information acquisition from the peripheral apparatus in hierarchic manner, and provides a computer program to be executed by the CPU 1102 for limiting the settable range of the parameter based on such hierarchic linking.

At first reference is made to the setting image shown in FIG. 15, for explaining the method of linking the time-out values in hierarchic manner.

Referring to FIG. 15, the parameter for an uppermost first layer consists of the status acquisition 110 of the peripheral apparatus. The parameter of a second layer under the first layer consists of the status acquisition 112 for the locally connected apparatus, the status acquisition 118 for the network connected apparatus and the status acquisition 124 for the apparatus connected to other computers. Also a third layer exists under the second layer. For example the third layer under the status acquisition 118 for the network connected apparatus consists of the status acquisition 120 for the network printer and the status acquisition 122 for the network scanner.

Thus the parameters stored in the HDD 1110 are hierarchically linked, and, in the present eighth embodiment, the change of a parameter of a lower layer is restricted not only by the setting range for such parameter but also by the settable range for the parameter of an immediately upper layer.

Figure 19:
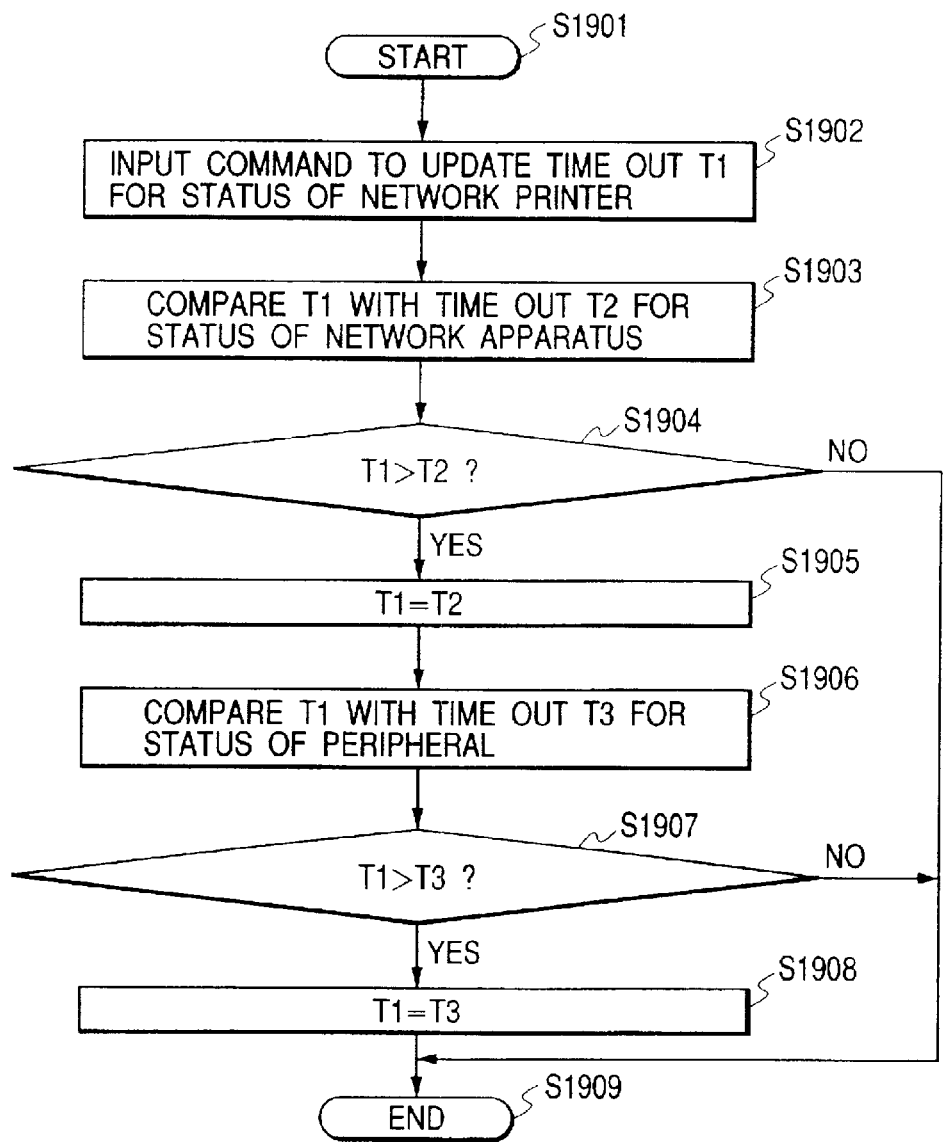
FIG. 19 is a flow chart of a program to be executed by a computer for information acquisition in an eighth embodiment.

Now reference is made to a flow chart shown in FIG. 19, for explaining the process in case the user enters a change in the time-out value for the status acquisition for the network printer on the setting image shown in FIG. 15.

At first, when a change in the time-out value (T1) is entered for acquiring the status of the network printer (step S1902), the computer displaying the setting image compares T1 with a time-out value (T2) for acquiring the status of the network apparatus (step S1903), and, if T2 is judged larger than T1 (step S1904), T2 is substituted in T1 (step S1905) in order to match the value T1 with the time-out value T2 for the status acquisition for the entire network apparatus.

Then the computer compares T1 with the time-out value (T3) for status acquisition for the peripheral apparatus (step S1906), and, if T3 is judged larger than T1 (step S1907), T3 is substituted in T1 (step S1908) in order to match the value T1 with the time-out value T3 for the status acquisition for the entire peripheral apparatus.

In the eighth embodiment, as explained in the foregoing, the plural time-out values for acquiring information from the peripheral apparatus are linked in hierarchic manner, and the change in the time-out value of a lower hierarchic layer is restricted also by the settable range of the parameter for the time-out value in an upper hierarchic layer.

Thus the management of the changed value, in changing the parameters for acquiring information from the peripheral apparatus, can be facilitated.

[Ninth Embodiment]

In the foregoing first to eighth embodiments, the time-out value for status acquisition is provided for each peripheral apparatus. In the ninth embodiment, there is provided a time-out value for the status acquisition for another purpose, such as the time-out value for the image data exchange with a peripheral apparatus.

FIG. 20 shows an example of the setting image in the ninth embodiment.

In this setting image, a set time-out value 2001 for access to the peripheral apparatus constitutes the settable upper limit value for the printer access time-out value 2002 and the scanner access time-out value 2008. Also the set value 2003 for the printer access time-out value constitutes the settable upper limit value for the time-out value 2004 for acquiring the printer status and the time-out value 2006 for the printer output. Further, the set value 2009 for the scanner access time-out value constitutes the settable upper limit value for the time-out value 2010 for acquiring the scanner status and the time-out value 2012 for the image input.

In the ninth embodiment, as explained in the foregoing, there is provided a time-out value for status acquisition for another application, such as the time-out value in the image data exchange with the peripheral apparatus.

These image-out values are classified, in the HDD 1110, in the categories of application, and a time-out value corresponding to the desired application is used in executing the status acquisition of the peripheral apparatus or the acquisition of the image data.

Thus, in case of communication with the peripheral apparatus utilizing a common protocol such as HTTP, it is rendered possible to set a time-out value suitable for each application.

For example, in case of a digital camera, it is rendered possible to set the time-out values separately for the status acquisition that can be executed within a relatively short time and for the image data acquisition requiring a long time. It is thus made possible to resolve the drawback of setting an unnecessarily long time-out value while the digital camera is in a state incapable of responding to the request for status acquisition, or the drawback that, because of setting of a short time-out value, the image data input operation from the digital camera is interrupted by the expiration of the time-out time.

[Tenth Embodiment]

The foregoing first to ninth embodiments employ, as the parameter in acquiring information from the peripheral apparatus, the time-out value from the issuance of the request for the information acquisition to the reception of the response thereto, but the tenth embodiment employs, as such parameter, the number of retries of the command requesting the acquisition of information.

FIG. 21 shows an example of the setting image for setting not only the time-out value but also the number of retries required for communication with the peripheral apparatus.

In this setting image, a set value 2115 for the number of retries in the access to the peripheral apparatus of the highest hierarchic layer constitutes the settable upper limit value for a number 2116 of retries in the access to the printer and a number 2122 of retries in the access to the scanner in the next hierarchic layer. Also a set value 2117 for the number of retries in the access to the printer constitutes the settable upper limit number for a number 2118 of retries in the printer status acquisition and a number 2120 of retries in the printer output in the next hierarchic layer. Further, a set value 2123 for the number of retries in the access to the scanner constitutes the settable upper limit number for a number 2124 of retries in the scanner status acquisition and a number 2126 of retries in the image input from the scanner, in the next hierarchic layer.

For example, in the setting image shown in FIG. 21, if the number 2115 of retries for the access to the peripheral apparatus is changed from 40 times to 20 times, the settable upper limit values for the number 2122 of retries for the access to the scanner, for the number 2124 of retries for the scanner status acquisition and for the number 2126 of retries for the image input from the scanner, which are in the next lower hierarchic layer, are automatically changed to 20 times, and the parameters 2123, 2125, 2127 of which set values exceed 20 are automatically changed to 20 times as shown in FIG. 22.

[Eleventh Embodiment]

The eleventh embodiment is featured by providing a parameter for information acquisition for each kind of the network between the computer requesting the acquisition of information and the peripheral apparatus constituting the object of information acquisition.

More specifically, parameters for information acquisition are provided respectively for a case where the network between the computer requesting the information acquisition and the peripheral apparatus constituting the object of information acquisition is via a high-speed channel, and for a case where such network is via a low-speed channel.

FIG. 23 shows an image displayed for entering various parameters in case the network is via a low-speed channel.

The user sets, by a kind 2300 of the channel displayed on the image shown in FIG. 23, either via a low-speed channel 2301 or via a high-speed channel 2302.

When the high-speed channel 2302 is set, parameters stored in the HDD 1110 corresponding to the connection via the high-speed channel are read out and displayed as shown in FIG. 23. When the low-speed channel 2310 is set, parameters stored in the HDD 1110 corresponding to the connection via the low-speed channel are read out and displayed as shown in FIG. 24.

Then, when the menu operation shown in FIG. 14 is executed, depending on whether the kind 2300 of the channel is set at the high-speed channel 2302 or the low-speed channel 2301, the corresponding parameters are read from the HDD 1110 and are utilized in the acquisition of various status information or image data.

In the foregoing example, there is selected either via the low-speed channel or via the high-speed channel as the kind of the network, but there may also be utilized other ways of selection.

For example, in case of access to the peripheral apparatus constituting the object of information acquisition, there may be provided parameters respectively for a case of so-called remote connection in which the access is made through a public channel to a network to which the peripheral apparatus belongs and for a case of making access to the peripheral apparatus through a LAN instead of the public channel.

Figure 25:
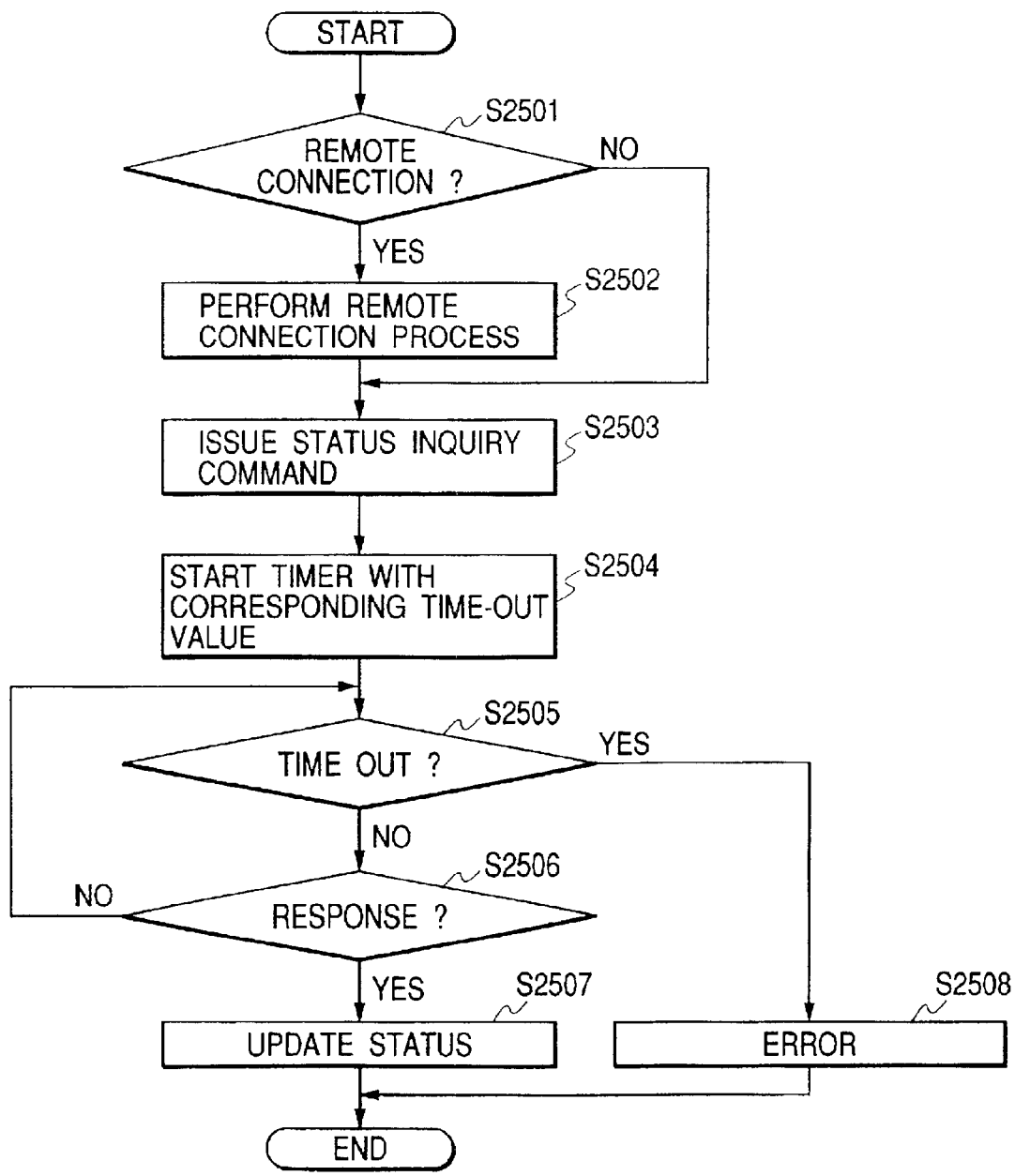
FIG. 25 is a flow chart of a program to be executed by a computer for information acquisition in the eleventh embodiment.

FIG. 25 is a flow chart showing the operation sequence of a computer acquiring information from a peripheral apparatus by remote connection to a network system to which the peripheral apparatus belongs.

The sequence is started when the user activates the information acquisition for the peripheral apparatus by the menu operation shown in FIG. 14.

A step S2501 discriminates whether the access to the network system to which the peripheral apparatus constituting the object of information acquisition belong is by a remote connection, based on the instruction given by the user, and, if it is by a remote connection, the sequence proceeds to a step S2502.

A step S2502 executes a dial-up connection process to the server computer of the network system to which the object peripheral apparatus belongs, and executes communication with such network system by a general protocol such as PPP.

On the other hand, if the access is not by the remote connection but by the LAN connection, communication is executed by a general protocol such as IEEE802.3 or the like.

Figure 12:
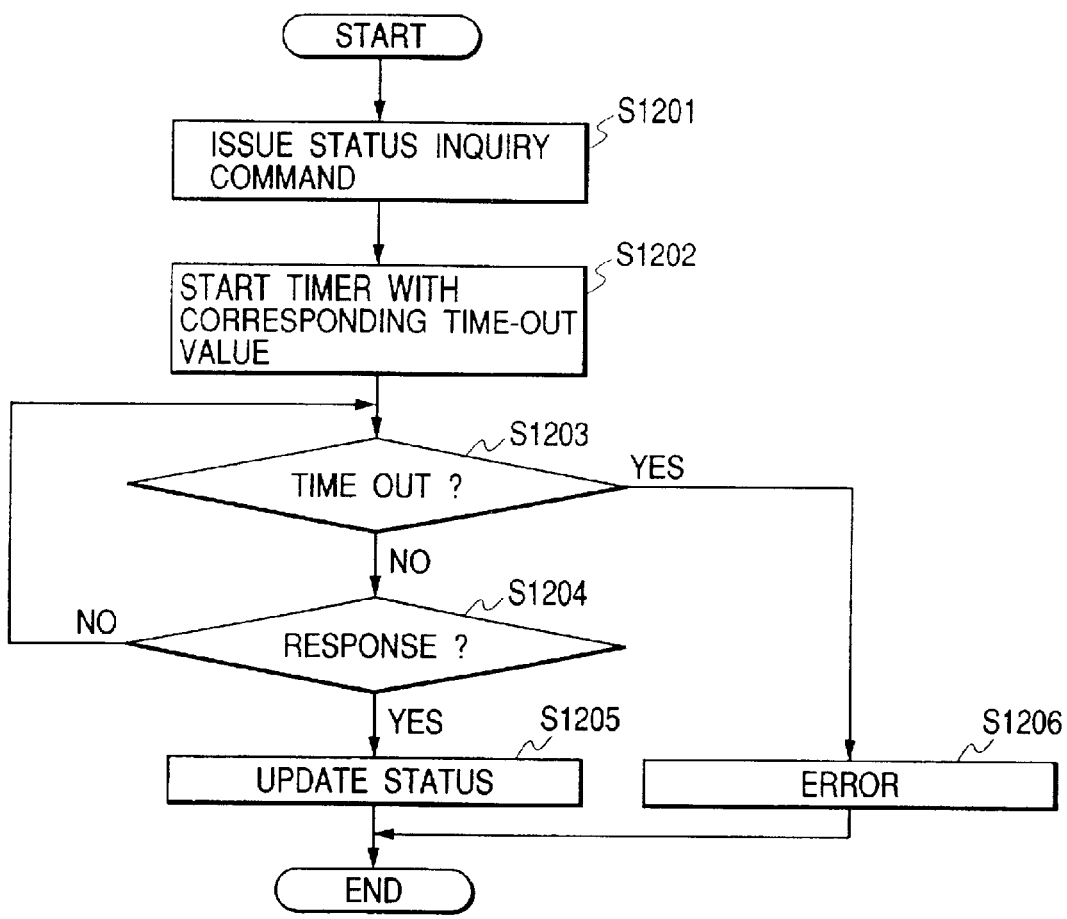
FIG. 12 is a flow chart of a program executed by the computer in this embodiment.

Steps S2503 to S2508 constitute a process for status acquisition by HTTP, which is same as explained in FIG. 12.

However, a step S2504 in FIG. 25 employs a time-out value corresponding to the selected one of the remote connection and the LAN connection.

In the eleventh embodiment, as explained in the foregoing, the parameters for information acquisition are provided corresponding to the kind of the network between the computer requesting the information acquisition and the peripheral apparatus constituting the object of information acquisition.

Thus suitable parameters can be automatically set even in case the user makes access to the peripheral apparatus while he is out of the office, utilizing the remote access function of a portable computer.

In the foregoing embodiments, the printer, scanner and modem have been explained as examples of the peripheral apparatus, but a facsimile apparatus may be adopted as an example of other peripheral apparatus. Thus the present invention is applicable also in case where the user of the computer (A) acquires, from a facsimile apparatus on the network, status information such as the result of transmission or the result of reception.

The objects of the present invention can naturally be attained also in a case where a memory medium storing the program codes of a software realizing the functions of the aforementioned embodiments is supplied to a system or an apparatus and the functions of the aforementioned embodiments are realized by a computer (CPU or MPU) of the above-mentioned system or apparatus by reading and executing the program codes stored in the memory medium. In such case the program codes themselves of the software realize the novel functions of the present invention, and for the memory medium storing the program codes constitutes the present invention.

The memory medium storing such program codes can be, for example, a floppy disk, a hard disk, an optical disk, a magnetooptical disk, a CD-ROM, a CD-R, a magnetic tape, a non-volatile memory card, or a ROM.

The present invention also includes not only a case where the functions of the aforementioned embodiments are realized by the execution of the program codes read by the computer but also a case where an operating system or the like functioning on the computer executes all or a part of the actual processes under the control of such program codes thereby realizing the functions of the foregoing embodiments.

The present invention further includes a case wherein the program codes read from the memory medium are once stored in a function expansion board inserted into the computer or a function expansion unit connected to the computer, and a CPU provided in the function expansion board or the function expansion unit executes all the process or a part thereof under the control of such program codes, thereby realizing the functions of the aforementioned embodiments.

Also such program codes can be native codes of the MPU, or codes described by a predetermined interpreter language and converted into the native codes of the MPU at the run time, or script data described in a predetermined format and interpreted and executed by the operating system.

According to an invention of the present application, a change by the user in the time-out value for the status acquisition is reflected on the parameters for other status acquisitions linked with the above-mentioned time-out value, so that the burden of operation in changing the time-out values according to the load of the network can be significantly alleviated.

Also according to another invention of the present application, the change in the time-out value is reflected only in a limited extent grouped by the kind of the peripheral apparatus, the time-out value can be set by a simple operation for each peripheral apparatus such as a printer or a scanner, according to the characteristics thereof, without paying attention to the detailed time-out value of each peripheral apparatus.

Also according to another invention of the present application, the linking for reflecting the change in the time-out value is executed according to the type of connection of the peripheral apparatus, so that the time-out value can be set with a simple operation for each type of connection such as a network connection or a local connection, according to the characteristics thereof.

What is claimed is:

1. An information processing apparatus capable of acquiring status information of a peripheral apparatus on a network, comprising:

acquisition means for acquiring the status information from the peripheral apparatus;

memory means for memorizing a time-out parameter that indicates a time-out time in a communication process for acquiring the status information corresponding to each event on the peripheral apparatus;

grouping means for grouping parameters corresponding to the respective events on the peripheral apparatus and related to the time-out parameter memorized by said memory means into a predetermined group;

alteration means for altering the value of one of the parameters grouped into the predetermined group by said grouping means; and control means adapted, in the event that the value of the one parameter is altered by said alteration means, to alter the values of the other parameters in the predetermined group according to the alteration of the one parameter.

2. An information processing apparatus according to claim 1, wherein said time-out parameter includes a time-out time in said communication process and a settable range for said time-out time; and said control means is adapted to judge the load on said network based on the content of alteration by said alteration means and to increase or decrease the value of said time-out time or said settable range.

3. An information processing apparatus according to claim 1, wherein the grouping by said grouping means is executed in the unit of a group based on the kind of the peripheral apparatus.

4. An information processing apparatus according to claim 3, wherein said group includes a group of printers and/or a group of scanners and/or a group of modems.

5. An information processing apparatus according to claim 1, wherein the grouping by said grouping means is executed in the unit of a group based on the kind of connection between said information processing apparatus and the peripheral apparatus.

6. An information processing apparatus according to claim 5, wherein said group includes a network connection group in which said information processing apparatus and the peripheral apparatus are connected through the network, and a local connection group in which said information processing apparatus and the peripheral apparatus are connected directly.

7. An information processing apparatus according to claim 6, wherein the network connection group includes a first group in which the peripheral apparatus is directly connected to the network and a second group in which the peripheral apparatus is connected through a gateway device to said network.

8. An information processing method for acquiring status information of a peripheral apparatus on a network, comprising:

an acquisition step of acquiring the status information from the peripheral apparatus;

a memory step of memorizing a time-out parameter that indicates a time-out time in a communication process for acquiring the status information corresponding to each event on the peripheral apparatus;

a grouping step of grouping parameters corresponding to the respective events on the peripheral apparatus and related to the time-out parameter memorized in said memory step into a predetermined group;

an alteration step of altering the value of one of the parameters grouped into the predetermined group in said grouping step; and a control step adapted, in the event that the value of the one parameter is altered by said alteration step, to alter the values of the other parameters in the predetermined group according to the alteration of the one parameter.

9. An information processing method according to claim 8, wherein said time-out parameter includes a time-out time in said communication process and a settable range for said time-out time; and said control step is adapted to judge the load on said network based on the content of alteration by said alteration step and to increase or decrease the value of said time-out time or said settable range according to said judgement.

10. An information processing method according to claim 8, wherein said grouping is executed in the unit of a group based on the kind of the peripheral apparatus.

11. An information processing method according to claim 10, wherein said group includes a group of printers and/or a group of scanners and/or a group of modems.

12. An information processing method according to claim 8, wherein said grouping is executed in the unit of a group based on the kind of connection between said information processing apparatus and the peripheral apparatus.

13. An information processing method according to claim 12, wherein said group includes a network connection group in which said information processing apparatus and the peripheral apparatus are connected through said network, and a local connection group in which said information processing apparatus and the peripheral apparatus are connected directly.

14. An information processing method according to claim 13, wherein said network connection group further includes a first group in which the peripheral apparatus is directly connected to said network and a second group in which the peripheral apparatus is connected through a gateway device to said network.

15. A computer readable memory storing a computer program to be executed in an information processing apparatus for acquiring status information of a peripheral apparatus on a network, said computer program comprising:

an acquisition step of acquiring the status information from the peripheral apparatus;

a memory step of memorizing a time-out parameter that indicates a time-out time in a communication process for acquiring the status information corresponding to each event on the peripheral apparatus;

a grouping step of grouping parameters corresponding to the respective events on the peripheral apparatus and related to the time-out parameter memorized in said memory step into a predetermined group:

an alteration step of altering the value of one of the parameters grouped into the predetermined group in said grouping step; and a control step adapted, in the event that the value of the one parameter is altered by said alteration step, to alter the values of the other parameters in the predetermined group according to the alteration of the one parameter.

16. A computer readable memory according to claim 15, wherein said time-out parameter includes a time-out time in said communication process and a settable range for said time-out time; and said control step is adapted to judge the load on said network based on the content of alteration by said alteration step and to increase or decrease the value of said time-out time or said settable range according to said judgment.

17. A computer readable memory according to claim 15, wherein said grouping is executed in the unit of a group based on the kind of the peripheral apparatus.

18. A computer readable memory according to claim 17, wherein said group includes a group of printers and/or a group of scanners and/or a group of modems.

19. A computer readable memory according to claim 15, wherein said grouping is executed in the unit of a group based on the kind of connection between said information processing apparatus and the peripheral apparatus.

20. A computer readable memory according to claim 19, wherein said group includes a network connection group in which said information processing apparatus and the peripheral apparatus are connected through said network, and a local connection group in which said information processing apparatus and the peripheral apparatus are connected directly.

21. A computer readable memory according to claim 20, wherein said network connection group further includes a first group in which the peripheral apparatus is directly connected to said network and a second group in which the peripheral apparatus is connected through a gateway device to said network.

* * * * *